(12) United States Patent
Cohen et al.

(10) Patent No.: US 12,272,042 B2
(45) Date of Patent: Apr. 8, 2025

(54) DETECTION OF DEFECTS USING A COMPUTATIONALLY EFFICIENT SEGMENTATION APPROACH

(71) Applicant: Applied Materials Israel Ltd., Rehovot (IL)

(72) Inventors: Elad Cohen, Beer Sheva (IL); Victor Egorov, Ramat Gan (IL); Ilan Ben-Harush, Rehovot (IL); Rafael Bistritzer, Petach Tikva (IL)

(73) Assignee: Applied Materials Israel Ltd., Rehovot (IL)

( * ) Notice: Subject to any disclaimer, the term of this patent is extended or adjusted under 35 U.S.C. 154(b) by 576 days.

(21) Appl. No.: 17/565,273

(22) Filed: Dec. 29, 2021

(65) Prior Publication Data

US 2023/0206417 A1 Jun. 29, 2023

(51) Int. Cl.
*G06T 7/00* (2017.01)
*G06T 7/10* (2017.01)

(52) U.S. Cl.
CPC .............. *G06T 7/0004* (2013.01); *G06T 7/10* (2017.01)

(58) Field of Classification Search
CPC ...................... G06T 7/0004; G06T 7/10; G06T 2207/10061; G06T 2207/30148; G06T 7/001; H01L 22/12; H01L 22/20; H01L 22/24; G01N 21/9501
See application file for complete search history.

(56) References Cited

U.S. PATENT DOCUMENTS

| | | | | |
|---|---|---|---|---|
| 6,389,181 B2 * | 5/2002 | Shaffer | .............. | H04N 1/00193 707/999.102 |
| 9,235,885 B2 | 1/2016 | Amzaleg et al. | | |
| 2006/0280358 A1 * | 12/2006 | Ishikawa | .......... | G01N 21/95607 382/149 |
| 2008/0317329 A1 * | 12/2008 | Shibuya | ................ | G06T 7/0004 382/149 |
| 2012/0045115 A1 * | 2/2012 | Dong | ................ | G01N 21/95607 382/149 |
| 2014/0212021 A1 * | 7/2014 | Amzaleg | ................. | G06T 7/001 382/149 |
| 2015/0063677 A1 * | 3/2015 | Huang | ............... | G01N 21/9501 382/149 |
| 2017/0169554 A1 * | 6/2017 | Karlinsky | ............... | G06T 7/001 |
| 2018/0275063 A1 * | 9/2018 | Singh | ...................... | H01L 22/12 |

* cited by examiner

*Primary Examiner* — Sheela C Chawan
(74) *Attorney, Agent, or Firm* — Lowenstein Sandler LLP

(57) ABSTRACT

There is provided a system of examination of a semiconductor specimen, comprising a processor and memory circuitry configured to obtain, for each given candidate defect of a plurality of candidate defects in an image of the specimen, a given area of the given candidate defect in the image, obtain a reference image, perform a segmentation of at least part of the reference image, to determine, for each given candidate defect, first reference areas in the reference image matching a given reference area corresponding to the given area, select among the first reference areas, a plurality of second reference areas, obtain a plurality of corresponding second areas in the image, and use data informative of a pixel intensity of the second areas and data informative of a pixel intensity of the given area to determine whether the given candidate defect corresponds to a defect.

20 Claims, 14 Drawing Sheets

DETECTION OF DEFECTS USING A COMPUTATIONALLY EFFICIENT SEGMENTATION APPROACH

TECHNICAL FIELD

The presently disclosed subject matter relates, in general, to the field of examination of a specimen, and more specifically, to automating the examination of a specimen.

BACKGROUND

Current demands for high density and performance associated with ultra large scale integration of fabricated devices require submicron features, increased transistor and circuit speeds, and improved reliability. Such demands require formation of device features with high precision and uniformity, which, in turn, necessitates careful monitoring of the fabrication process, including automated examination of the devices while they are still in the form of semiconductor wafers.

Examination processes are used at various steps during semiconductor fabrication to detect and classify defects on specimens. Effectiveness of examination can be increased by automatization of process(es) as, for example, Automatic Defect Classification (ADC), Automatic Defect Review (ADR), etc.

U.S. Pat. No. 9,235,885 of the Applicant (content of this patent is incorporated by reference herein in its entirety) describes a system capable of inspecting an article for defects, the system including: a patch comparator, configured to determine with respect to each of a plurality of reference patches in a reference image a similarity level, based on a predefined patch-similarity criterion and on a source patch defined in the reference image; an evaluation module, configured to rate each inspected pixel out of multiple inspected pixels of the inspection image with a representative score which is based on the similarity level of a reference patch associated with a reference pixel corresponding to the inspected pixel; a selection module, configured to select multiple selected inspected pixels based on the representative scores of the multiple inspected pixels; and a defect detection module, configured to determine a presence of a defect in the candidate pixel based on an inspected value of the candidate pixel and inspected values of the selected inspected pixels.

SUMMARY

In accordance with certain aspects of the presently disclosed subject matter, there is provided a system of examination of a semiconductor specimen, the system comprising a processor and memory circuitry (PMC) configured to: obtain, for each given candidate defect of a plurality of candidate defects in an image of the semiconductor specimen acquired by an examination tool, a given area of the given candidate defect in the image, obtain a reference image, perform a segmentation of at least part of the reference image, the segmentation comprising, for each given candidate defect: obtaining a given reference area in the reference image corresponding to the given area of said given candidate defect in the image according to a correspondence criterion, determining first reference areas in the reference image, wherein, for each given first reference area, first data informative of a pixel intensity of said given first reference area matches first data informative of a pixel intensity of the given reference area according to a first similarity criterion, for each given candidate defect: for each given first reference area, compare second data informative of a pixel intensity of said given first reference area to second data informative of a pixel intensity of the given reference area, select among the first reference areas, a plurality of second reference areas for which the comparison indicates a match according to a second similarity criterion, obtain a plurality of second areas in the image, wherein each given second area corresponds to one of the second reference areas according to the correspondence criterion, and use data informative of a pixel intensity of the second areas and data informative of a pixel intensity of the given area to determine whether the given candidate defect corresponds to a defect.

According to some embodiments, for each given candidate defect, a number of the second reference areas is smaller than a number of the first reference areas.

According to some embodiments, the PMC is configured to apply at least one filter to the image to obtain at least one processed image; for each given first reference area, determine the first data informative of a pixel intensity of said first given reference area using said at least one processed image, and determine the first data informative of a pixel intensity of the given reference area using said at least one processed image.

According to some embodiments, the at least one processed image is calculated once for all candidate defects.

According to some embodiments, the second data informative of a pixel intensity of the given reference area and the second data informative of a pixel intensity of each given first reference area is determined using at least one of the reference image, or one or more second processed images obtained using filtering of at least part of the reference image or of an image generated using the reference image. According to some embodiments, the second data informative of a pixel intensity of the given reference area includes a reference patch informative of one or more pixels of the given reference area; for each given first reference area, the second data informative of a pixel intensity of the given first reference area includes a patch informative of one or more pixels of the given first reference area, and wherein the system is configured to compare the patch of the given first reference area to the reference patch.

According to some embodiments, the PMC is configured to select a limited subset of pixels of the reference patch, and for each given first reference area, compare data informative of pixel intensity of the limited subset of pixels of the reference patch to data informative of pixel intensity of corresponding pixels in the patch of the given first reference area.

According to some embodiments, selecting the limited subset of pixels comprises at least one of selecting pixels for which corresponding pixels in the image are associated with a pixel intensity which is above a threshold, or selecting pixels for which corresponding pixels in the image are associated with a probability of presence of a defect which is above a threshold.

According to some embodiments, for each given candidate defect, selecting the second reference areas among the first reference areas is more computationally efficient than selecting the second reference areas among the whole reference image.

According to some embodiments, for each given first reference area, the first data informative of a pixel intensity of said given first reference area is different from the second data informative of a pixel intensity of said given first reference area.

According to some embodiments, the PMC configured to, for each given candidate defect of a plurality of candidate defects: obtain, for each given candidate defect of a plurality of candidate defects, a first given area of the given candidate defect in a first image of the semiconductor specimen acquired by an examination tool and a second given area of the given candidate defect in a second image of the semiconductor specimen acquired by the examination tool, wherein the second image differs from the first image by at least one parameter, determine whether the candidate defect is a defect using the first image only if the candidate pixel meets a relevance criterion in the first image, and/or determine whether the candidate defect is a defect using the second image only the candidate pixel meets a relevance criterion in the second image.

In accordance with certain aspects of the presently disclosed subject matter, there is provided a method of examination of a semiconductor specimen, the method comprising, by a processor and memory circuitry (PMC): obtaining, for each given candidate defect of a plurality of candidate defects in an image of the semiconductor specimen acquired by an examination tool, a given area of the given candidate defect in the image, obtaining a reference image, performing a segmentation of at least part of the reference image, the segmentation comprising, for each given candidate defect, obtaining a given reference area in the reference image corresponding to the given area of said given candidate defect in the image according to a correspondence criterion, determining first reference areas in the reference image, wherein, for each given first reference area, first data informative of a pixel intensity of said given first reference area matches first data informative of a pixel intensity of the given reference area according to a first similarity criterion; for each given candidate defect, for each given first reference area, comparing second data informative of a pixel intensity of said given first reference area to second data informative of a pixel intensity of the given reference area, selecting among the first reference areas, a plurality of second reference areas for which the comparison indicates a match according to a second similarity criterion, obtaining a plurality of second areas in the image, wherein each given second area corresponds to one of the second reference areas according to the correspondence criterion, and using data informative of a pixel intensity of the second areas and data informative of a pixel intensity of the given area to determine whether the given candidate defect corresponds to a defect.

According to some embodiments, the method can implement one or more features as described above with reference to the system.

In accordance with certain other of the presently disclosed subject matter, there is provided a non-transitory computer readable medium comprising instructions that, when executed by a processor, cause the processor to perform operations as described above for the method.

According to some embodiments, the proposed solution enables to increase a number of candidate defects provided to a defect detection algorithm, without increasing computation time required by the defect detection algorithm to analyze the candidate defects.

According to some embodiments, the proposed solution enables to increase a number of candidate defects provided to a defect detection algorithm while keeping the same throughput.

According to some embodiments, the proposed solution enables to increase computational efficiency of a defect detection algorithm, while maintaining a similar sensitivity.

According to some embodiments, the proposed solution enables to detect more defects than prior art algorithms, while maintaining the same computational effort.

According to some embodiments, the proposed solution enables to decrease computational time for analysing each candidate defect.

According to some embodiments, the proposed solution optimizes processing of multi-perspective images.

BRIEF DESCRIPTION OF THE DRAWINGS

In order to understand the disclosure and to see how it may be carried out in practice, embodiments will now be described, by way of non-limiting example only, with reference to the accompanying drawings, in which.

DETAILED DESCRIPTION OF EMBODIMENTS

Figure 1:
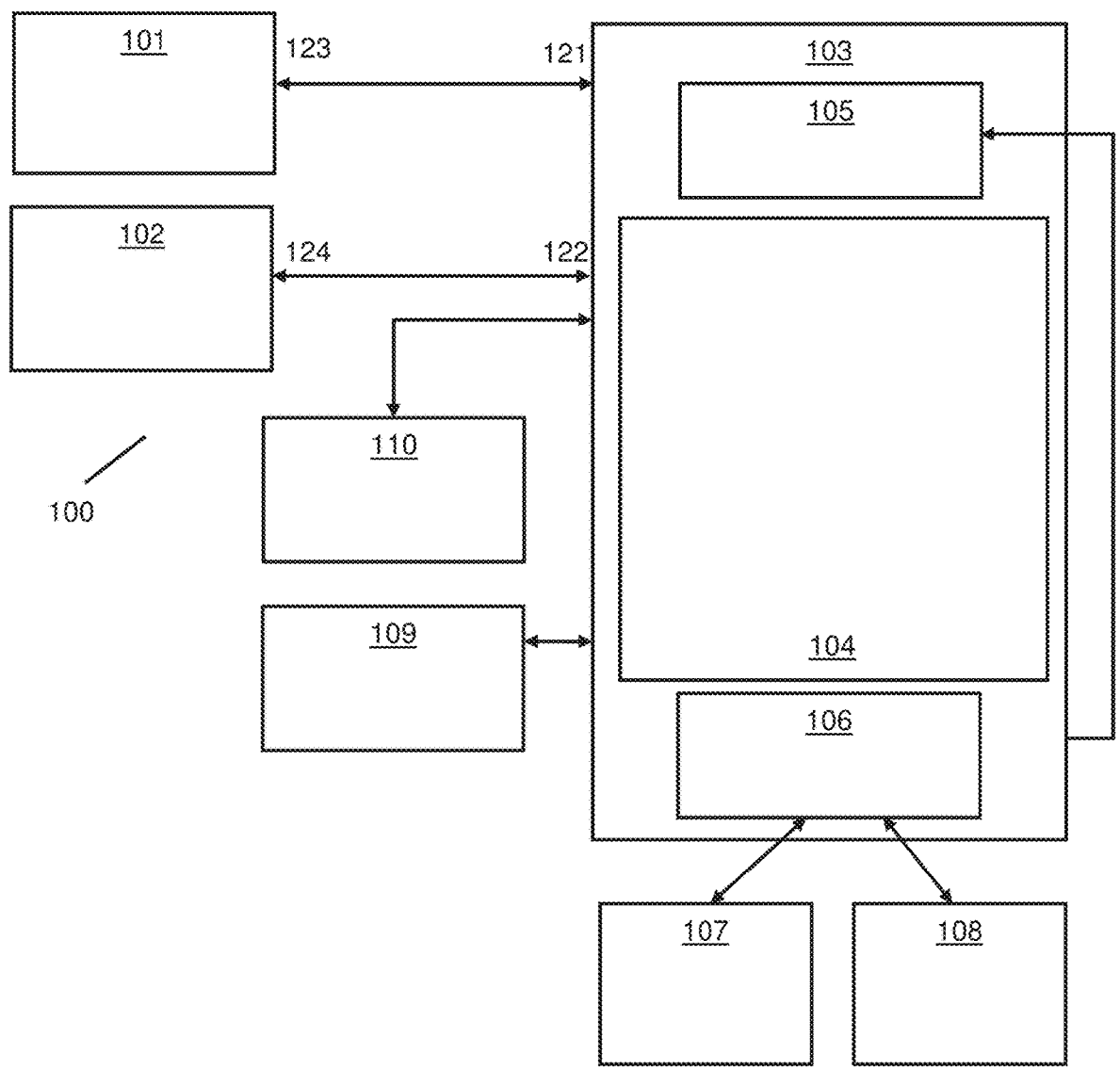
FIG. 1 illustrates a generalized block diagram of an examination system in accordance with certain embodiments of the presently disclosed subject matter.

In the following detailed description, numerous specific details are set forth in order to provide a thorough understanding of the disclosure. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "processing", "obtaining", "selecting", "determining", "generating", "using", "comparing", "determining" or the like, refer to the action(s) and/or process(es) of a computer that manipulate and/or transform data into other data, said data represented as physical, such as electronic, quantities and/or said data representing the physical objects. The term "computer" should be expansively construed to cover any kind of hardware-based electronic device with data processing capabilities including, by way of non-limiting example, the system 103 and respective parts thereof disclosed in the present application.

The terms "non-transitory memory" and "non-transitory storage medium" used herein should be expansively construed to cover any volatile or non-volatile computer memory suitable to the presently disclosed subject matter.

The term "specimen" used in this specification should be expansively construed to cover any kind of wafer, masks, and other structures, combinations and/or parts thereof used for manufacturing semiconductor integrated circuits, magnetic heads, flat panel displays, and other semiconductor-fabricated articles.

The term "examination" used in this specification should be expansively construed to cover any kind of metrology-related operations as well as operations related to detection and/or classification of defects in a specimen during its fabrication. Examination is provided by using non-destructive examination tools during or after manufacture of the specimen to be examined. By way of non-limiting example, the examination process can include runtime scanning (in a single or in multiple scans), sampling, reviewing, measuring, classifying and/or other operations provided with regard to the specimen or parts thereof using the same or different inspection tools. Likewise, examination can be provided prior to manufacture of the specimen to be examined and can include, for example, generating an examination recipe(s) and/or other setup operations. It is noted that, unless specifically stated otherwise, the term "examination" or its derivatives used in this specification are not limited with respect to resolution or size of an inspection area. A variety of non-destructive examination tools includes, by way of non-limiting example, scanning electron microscopes, atomic force microscopes, optical inspection tools, etc.

By way of non-limiting example, run-time examination can employ a two phase procedure, e.g. inspection of a specimen followed by review of sampled locations of potential defects. During the first phase, the surface of a specimen is inspected at high-speed and relatively low-resolution. In the first phase, a defect map is produced to show suspected locations on the specimen having high probability of a defect. During the second phase at least part of the suspected locations are more thoroughly analyzed with relatively high resolution. In some cases both phases can be implemented by the same inspection tool, and, in some other cases, these two phases are implemented by different inspection tools.

The term "defect" used in this specification should be expansively construed to cover any kind of abnormality or undesirable feature formed on or within a specimen.

It is appreciated that, unless specifically stated otherwise, certain features of the presently disclosed subject matter, which are described in the context of separate embodiments, can also be provided in combination in a single embodiment. Conversely, various features of the presently disclosed subject matter, which are described in the context of a single embodiment, can also be provided separately or in any suitable sub-combination. In the following detailed description, numerous specific details are set forth in order to provide a thorough understanding of the methods and apparatus.

Bearing this in mind, attention is drawn to FIG. 1 illustrating a functional block diagram of an examination system in accordance with certain embodiments of the presently disclosed subject matter. The examination system 100 illustrated in FIG. 1 can be used for examination of a specimen (e.g. of a wafer and/or parts thereof) as part of the specimen fabrication process. The illustrated examination system 100 comprises computer-based system 103 capable of automatically determining metrology-related and/or defect-related information using images obtained during specimen fabrication. System 103 can be operatively connected to one or more low-resolution examination tools 101 and/or one or more high-resolution examination tools 102 and/or other examination tools. The examination tools are configured to capture images and/or to review the captured image(s) and/or to enable or provide measurements related to the captured image(s). System 103 can be further operatively connected to CAD server 110 and data repository 109.

System 103 includes a processor and memory circuitry (PMC) 104 operatively connected to a hardware-based input interface 105 and to a hardware-based output interface 106. PMC 104 is configured to provide all processing necessary for operating the system 103 as further detailed hereinafter (see methods described in FIGS. 2A, 5A, 7A, 7B and 8A which can be performed at least partially by system 103) and includes a processor (not shown separately) and a memory (not shown separately).

System 103 is configured to receive, via input interface 105, input data. Input data can include data (and/or derivatives thereof and/or metadata associated therewith) produced by the examination tools and/or data produced and/or stored in one or more data repositories 109 and/or in CAD server 110 and/or another relevant data depository. It is noted that input data can include images (e.g. captured images, images derived from the captured images, simulated images, synthetic images, etc.) and associated numeric data (e.g. metadata, hand-crafted attributes, etc.). It is further noted that image data can include data related to a layer of interest and/or to one or more other layers of the specimen.

System 103 is further configured to process at least part of the received input data and send, via output interface 106, the results (or part thereof) to a storage system 107, to examination tool(s), to a computer-based graphical user interface (GUI) 108 for rendering the results and/or to external systems (e.g. Yield Management System (YMS) of a FAB). GUI 108 can be further configured to enable user-specified inputs related to operating system 103.

By way of non-limiting example, a specimen can be examined by one or more low-resolution examination machines 101 (e.g. an optical inspection system, low-resolution SEM, etc.). The resulting data (referred to hereinafter as low-resolution image data 121), informative of low-resolution images of the specimen, can be transmitted—directly or via one or more intermediate systems—to system 103. Alternatively or additionally, the specimen can be examined by a high-resolution machine 102 (e.g. a subset of potential defect locations selected for review can be reviewed by a scanning electron microscope (SEM) or Atomic Force Microscopy (AFM)). The resulting data (referred to hereinafter as high-resolution image data 122) informative of high-resolution images of the specimen can be transmitted—directly or via one or more intermediate systems—to system 103.

It is noted that images of a desired location on a specimen can be captured at different resolutions. By way of non-limiting example, so-called "defect images" of the desired location are usable to distinguish between a defect and a false alarm, while so-called "class images" of the desired location are obtained with higher resolution and are usable for defect classification. In some embodiments, images of the same location (with the same or different resolutions) can comprise several images registered therebetween (e.g. images captured from the given location and one or more reference images corresponding to the given location).

It is noted that image data can be received and processed together with metadata (e.g. pixel size, text description of defect type, parameters of image capturing process, etc.) associated therewith.

Upon processing the input data (e.g. low-resolution image data and/or high-resolution image data, optionally together with other data as, for example, design data, synthetic data, etc.), system 103 can send the results (e.g. instruction-related data 123 and/or 124) to any of the examination tool(s), store the results (e.g. defect attributes, defect classification, etc.) in storage system 107, render the results via GUI 108 and/or send to an external system (e.g. to YMS).

Those versed in the art will readily appreciate that the teachings of the presently disclosed subject matter are not bound by the system illustrated in FIG. 1; equivalent and/or modified functionality can be consolidated or divided in another manner and can be implemented in any appropriate combination of software with firmware and/or hardware.

Without limiting the scope of the disclosure in any way, it should also be noted that the examination tools can be implemented as inspection machines of various types, such as optical imaging machines, electron beam inspection machines and so on. In some cases, the same examination tool can provide low-resolution image data and high-resolution image data. In some cases, at least one examination tool can have metrology capabilities.

It is noted that the examination system illustrated in FIG. 1 can be implemented in a distributed computing environment, in which the aforementioned functional modules shown in FIG. 1 can be distributed over several local and/or remote devices and can be linked through a communication network. It is further noted that in other embodiments at least some examination tools 101 and/or 102, data repositories 109, storage system 107 and/or GUI 108 can be external to the examination system 100 and operate in data communication with system 103 via input interface 105 and output interface 106. System 103 can be implemented as stand-alone computer(s) to be used in conjunction with the examination tools. Alternatively, the respective functions of the system can, at least partly, be integrated with one or more examination tools.

Figure 2A:
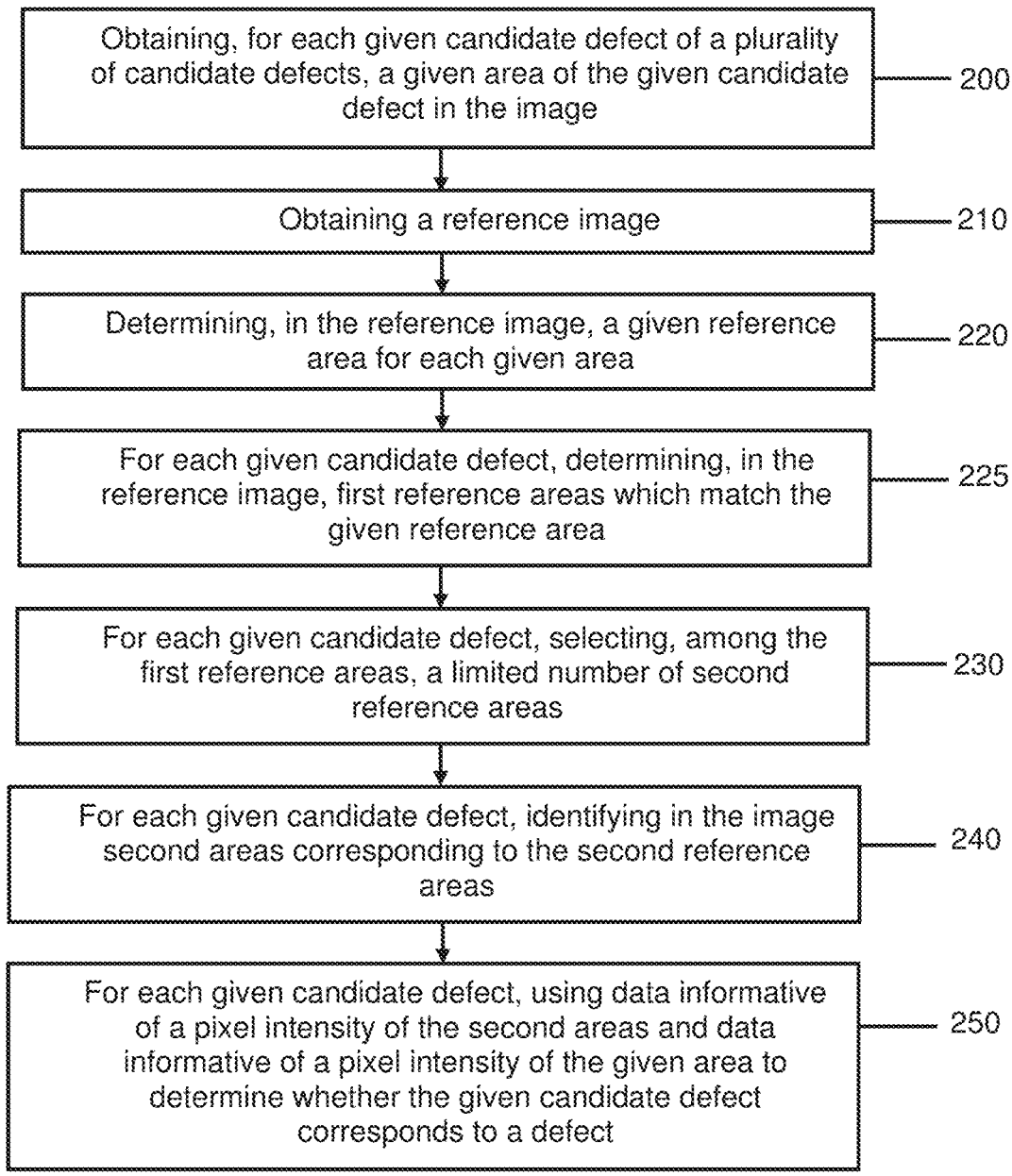
FIG. 2A illustrates a generalized flow-chart of a method of determining whether each candidate defect is a defect in an image of a specimen.
Figure 2B:
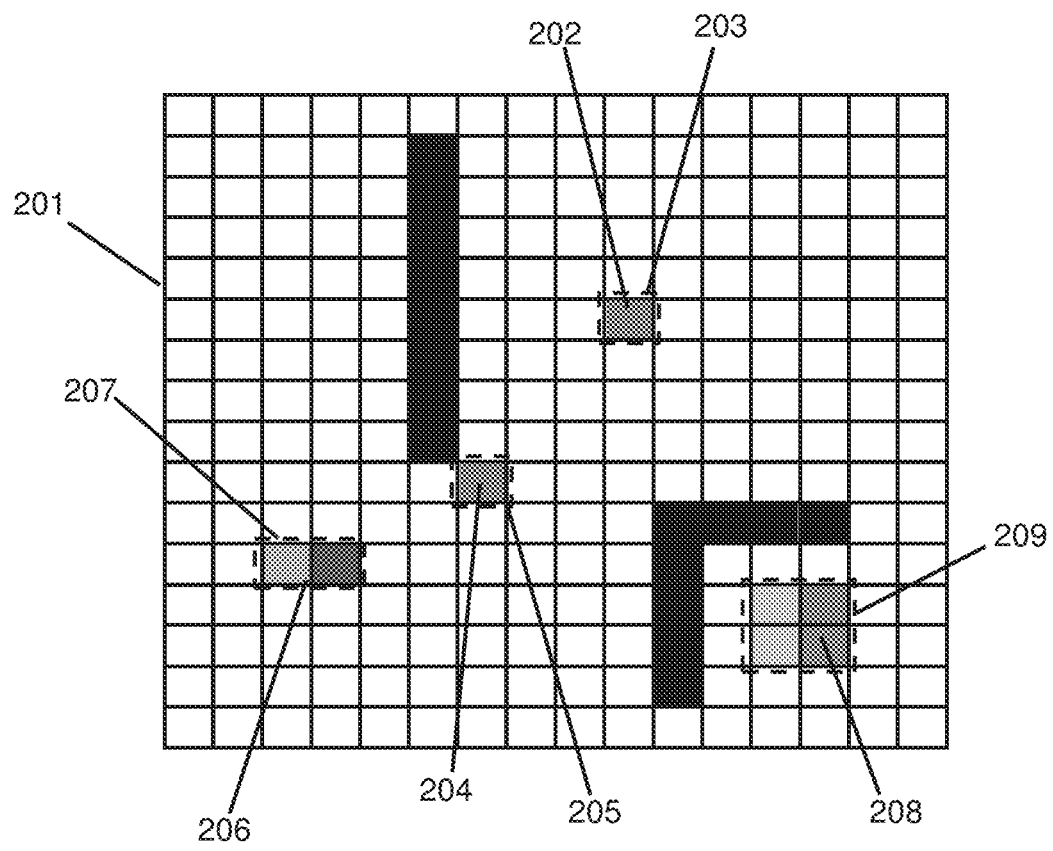
FIG. 2B illustrates a non-limitative example of candidate defects in an image of a specimen.
Figure 2C:
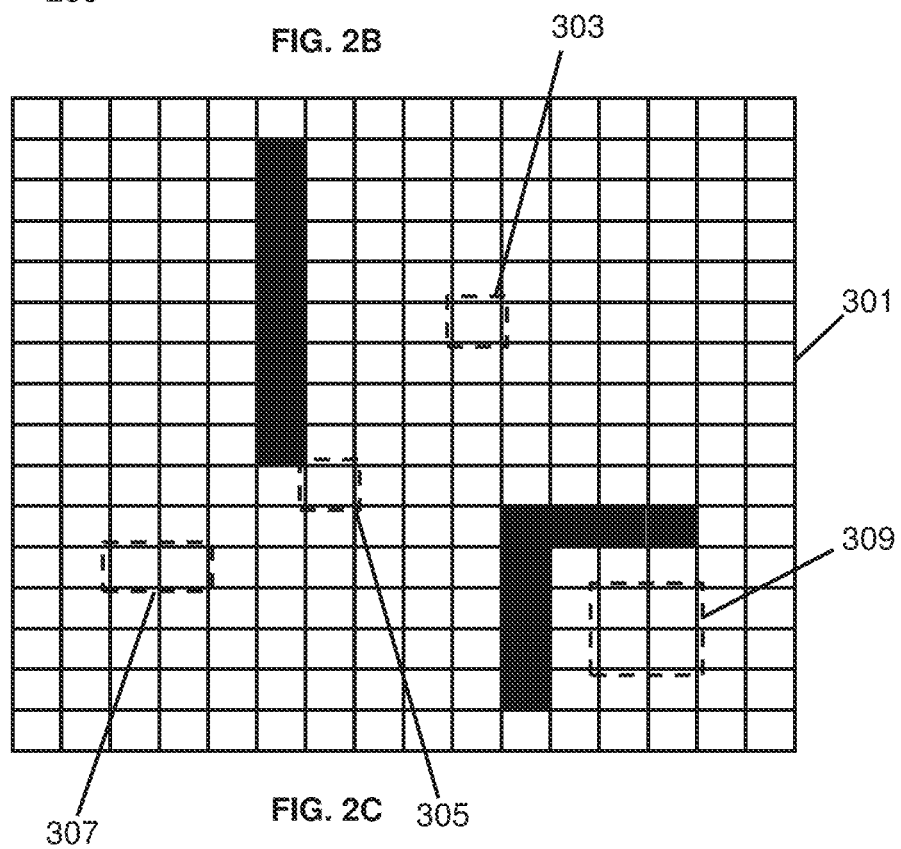
FIG. 2C illustrates a non-limitative example of reference areas identified in a reference image of the specimen, each reference area corresponding to a different candidate defect.

Attention is now drawn to FIGS. 2A to 2C. The method of FIG. 2A includes (operation 200) obtaining data informative of a plurality of candidate defects in an image 201 of a semiconductor specimen acquired by an examination tool (such as examination tool 101 and/or 102). The data includes, for each given candidate defect, an area in the image indicative of the location of the candidate defect in the image. The area can include at least one pixel, or, in some embodiments, a plurality of pixels. The data can further include, for each area, pixel intensity of each pixel of the area. Pixel intensity corresponds e.g. to a grey level intensity. This is however not limitative and pixel intensity can include various different components (e.g. pixel intensity for different channels, such as brightfield and greyfield, RGB, etc.), depending on the examination tool and the type of acquisition. In the non-limitative example of FIG. 2B, candidate defect 202 is associated with area 203, candidate defect 204 is associated with area 205, candidate defect 206 is associated with area 207 and candidate defect 208 is associated with area 209.

Data informative of the plurality of candidate defects in the image 201 can be provided by a system configured to perform a first determination of candidate defects in the image (based e.g. on pixel intensity and/or patterns of the candidate defects in the image). In some embodiments, the first determination of candidate defects can be performed using an image acquired by the low-resolution examination machines 101. Since the number of candidate defects can be very large, it is required to use an additional method (such as the method of FIG. 2A) to identify the actual defects among the candidate defects.

The method of FIG. 2A further includes obtaining (operation 210) a reference image 301. According to some embodiments, a plurality of reference images 301 is obtained. Each reference image 301 is a reference image of the image 201.

The image 201 is informative of a first zone of a semiconductor specimen and the reference image 301 is an image of a reference zone of a specimen (e.g. die, cell, etc.). The first zone is configured to meet a similarity criterion with regard to the reference zone and can belong to the same or to a different semiconductor specimen. The similarity criterion can define, for example, that the first zone and the reference zone correspond to the same physical components or to similar zones of the semiconductor specimen (e.g. similar dies, cells, etc.).

The image 201 and the reference image 301 are comparable (e.g. die-to-die, cell-to-cell, die-to-database, etc.).

According to some embodiments, the reference image 301 is an image of a reference area of a specimen (e.g. die, cell, etc.), wherein the respective image data are verified to represent the reference area that is clear of defects. The reference image can be an image captured from a reference (golden) die, reference cell, or other area verified as being clear of defects. Alternatively, or additionally, the reference image can be simulated using CAD data and/or can be augmented after capturing to exclude defects (if any) in the reference area.

According to some embodiments, in order to ensure compatibility between the images, the at least one reference image 301 and the image 201 undergo a registration procedure.

The method of FIG. 2A further includes performing a first segmentation of at least part of the reference image 301.

As mentioned above, for each candidate defect, a given area in the image 201 has been obtained. The method includes determining (operation 220) a given reference area in the reference image 301 which corresponds to the given area in the image 201 according to a correspondence criterion.

Assume that the image 201 and the reference image 301 are aligned, then for each pixel of the image 201, there is a corresponding pixel in the reference image 301 which has a similar location in the reference image 301. Note that if the image 201 and the reference image 301 are not perfectly aligned (or due to other factors), then a pixel located at given location in the image 201 can correspond to a pixel of the reference image 301 with a different location in the reference image 301.

In some embodiments, the given reference area is selected as the area of the reference image 301 which has the same position in the reference image 301 as the given area in the image 201.

Corresponding pixels of different images are assumed to represent corresponding locations of the specimen (or corresponding locations in similar specimens). For example, assuming that a pixel $P_{201}$ of the image 201 and a pixel $P_{301}$ of the reference image 301 are corresponding to each other, the positioning of an area of the specimen which is represented by pixel $P_{201}$ with respect to the first die (or cell or specimen) in which that area is included may be substantially the same as the positioning of an area of the specimen which is represented by pixel $P_{301}$ with respect to the second die (cell or specimen) in which it is included.

According to some embodiments, the given area in the image 201 and the given reference area in the reference image 301 are supposed to be informative of at least part of the same element. For example, assume that the given area is informative of a metal line at a particular location within the specimen, then the given reference area is expected to be informative of a similar metal line at the same particular location within the reference specimen (e.g. in another specimen comparable to the specimen).

In the non-limitative example of FIGS. 2B and 2C, given areas 203, 205, 207 and 209 in the image 201 correspond respectively to the reference areas 303, 305, 307 and 309 in the reference image 301.

The reference image 301 is processed to identify (operation 225), for each given reference area in the reference image 301, first reference areas in the reference image 301. The first reference areas are selected such that, for each given first reference area, first data informative of a pixel intensity of the given first reference area matches first data informative of a pixel intensity of the given reference area in the reference image 301 according to a first similarity criterion. Examples of the first data and of the first similarity criterion are provided hereinafter. As visible from the examples provided hereinafter, the first data informative of a pixel intensity of the given first reference area are selected to be of the same type as the first data informative of a pixel intensity of the given reference area, in order for them to be comparable.

In other words, for each given reference area, at least some of the first reference areas are supposed to be informative of one or more elements which are similar to the one or more elements present in the given reference area. For example, if the given reference area is informative of a contact, it is expected that at least some of the first reference areas are also informative of a similar contact.

Figure 3A:
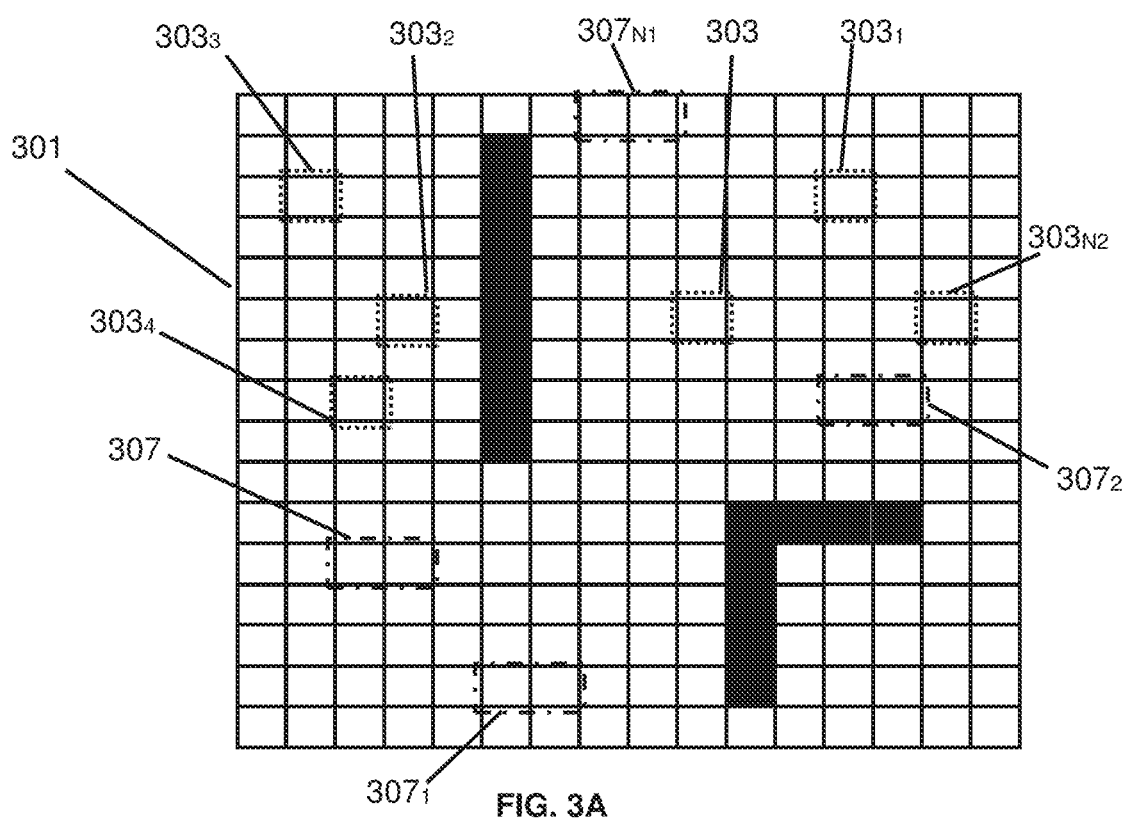
FIG. 3A illustrates a non-limitative example of first reference areas identified in a reference image of the specimen, the first reference areas being associated with a given reference area.

In the example depicted in FIG. 3A, for the reference area 307 (identified at operation 220), first reference areas $307_1$ to $307_{N1}$ have been identified in the reference image 301. For the reference area 303 (identified at operation 220), first reference areas $303_1$ to $303_{N2}$ have been identified in the reference image 301.

According to some embodiments, at operation 225, the reference image 301 is processed to generate a processed reference image. According to some embodiments, a filter (also called "kernel") is applied to the reference image 301 to obtain the processed reference image (this can include a convolution operation between the reference image 301 and the filter). In some embodiments, a filter is applied to the whole reference image 301 to obtain the processed reference image. In some embodiments, since the whole reference image 301 is processed together with respect to a given filter, the computational efficiency of this operation is high.

Figure 3B:
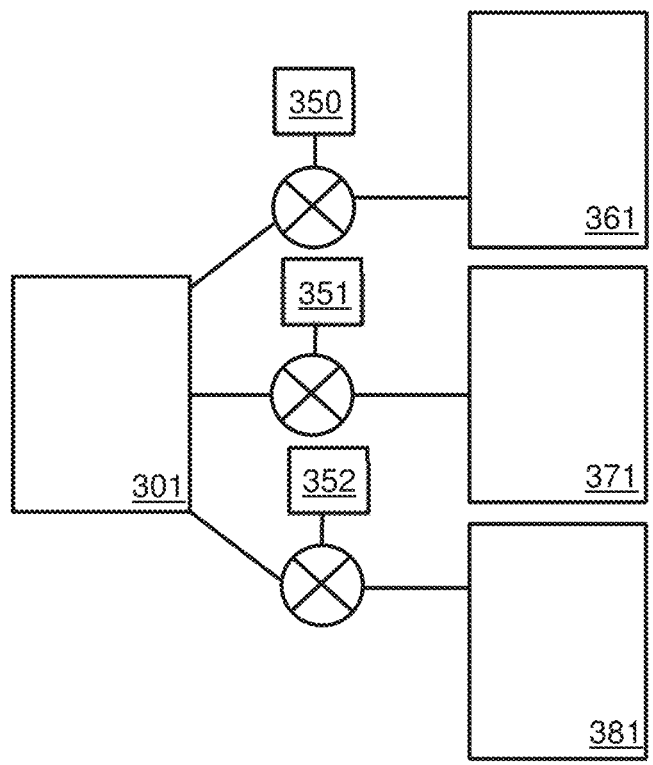
FIG. 3B illustrates a non-limitative method of processing a reference image to obtain a plurality of processed reference images.

According to some embodiments, the whole reference image 301 is processed using a limited number of filters to obtain a limited number of processed image(s). This is depicted in FIG. 3B, in which filters 350, 351 and 352 are respectively applied to the reference image 301 in order to obtain respectively processed images 361, 371 and 381. Although the reference image 301 includes a plurality of reference areas (one per candidate defect), it is possible to use the same processed image(s) to identify, for each given reference area, the first reference areas which are similar to the given reference area.

Since the processed image(s) is (are) calculated once for all candidate defects, it is not necessary to recalculate each time the processed image(s) for each different candidate defect. To the contrary, the same processed image(s) calculated once can be used for identifying the first reference areas associated with each given reference area. As a consequence, computational efficiency of operation 225 is high.

According to some embodiments, the filter is a derivative filter (derivative kernel) which enables to obtain a derivative of pixel intensity of the reference image 301. The filter can be convolved with the reference image 301. Two non-limitative examples of this filter are provided hereinafter:

$$G_x = \begin{bmatrix} -1 & 0 & 1 \\ -2 & 0 & 2 \\ -1 & 0 & 1 \end{bmatrix}$$

$$G_y = \begin{bmatrix} -1 & -2 & -1 \\ 0 & 0 & 2 \\ 1 & 2 & 1 \end{bmatrix}$$

The first filter $G_x$ (also called Sobel kernel along the X axis) can be used in particular to determine derivative along the horizontal axis (X axis) and the second filter $G_y$ (also called Sobel kernel along the Y axis) can be used in particular to determine derivative along the vertical axis (Y axis).

According to some embodiments, the filter is a high-pass filter (high-pass kernel).

Since the reference image 301 is a two-dimensional image, pixel position can be represented using a two-axis (x, y) coordinate system. According to some embodiments, a first filter $D_x$ is applied to the reference image 301 to obtain a processed image (for which the reference image 301 has been processed along axis "x") and a second filter $D_y$ is applied to the reference image 301 to obtain a another processed image along axis "y" (for which the reference image 301 has been processed along axis "y") and a third filter D is applied to the reference image 301 to obtain a another processed image. In some embodiments, $D_x$ is a derivative filter enabling to obtain a derivative of the reference image 301 along axis "x", $D_y$ is a derivative filter enabling to obtain a derivative of the reference image 301 along axis "y" and D is a derivative filter enabling to obtain a derivative of the reference image 301 both along axes "x" and "y".

In a non-limitative example, $D_x$ is defined as follows:

$$\begin{bmatrix} -1 & -2 & 0 & 2 & 1 \\ -4 & -8 & 0 & 8 & 4 \\ -6 & -12 & 0 & 12 & 6 \\ -4 & -8 & 0 & 8 & 4 \\ -1 & -2 & 0 & 2 & 1 \end{bmatrix}$$

$D_y$ can be defined as the transposition of $D_x$. These values are not limitative.

Based on this segmentation, for each given reference area, first reference areas are determined in the reference image which are similar to this given reference area.

Operation 225 can include using the processed reference image(s). In particular, for each given reference area, operation 225 can include selecting first reference areas which have a pixel intensity distribution (in the reference image and/or in the processed reference image(s)—this corresponds to first data informative of a pixel intensity of the first reference areas) which is similar to the pixel intensity distribution of the given reference area (in the reference image and/or in the processed reference image(s)—this corresponds to first data informative of a pixel intensity of the given reference area).

The similarity can be assessed according to the first similarity criterion. For example, assume that a given reference area includes a given pixel with a given pixel intensity in the reference image (respectively in the processed image). The given pixel intensity is compared to pixel intensity of other pixels of the reference image (respectively of the processed image). The pixels can be sorted (classified) based on this comparison. The pixels for which the comparison indicates the highest level of similarity can be selected as the first reference areas. The first similarity criterion defines e.g. the threshold for which the level of similarity is considered as sufficient, and/or can define the maximal number N of pixels which can be selected as similar pixels (this corresponds to the top N pixels after sorting of the pixels, which are the most similar with the given pixel).

If a plurality of processed images is obtained, each pixel of the reference image 301 is associated with a vector comprising a plurality of values (one per processed image— the vector can also include a value of the intensity of the pixel in the reference image). This vector is another example of first data informative of pixel intensity mentioned above. The vector of the pixel of each given reference area is compared to the vectors of the pixels of other areas of the reference image 301. The comparison between the vectors can use e.g. cross-correlation, cross-entropy, magnitude comparison, direction comparison, etc. This is however not limitative. The pixels of the reference image 301 can be sorted based on this result of the comparison. For each given reference area, it is possible to use this sorting to identify a plurality of first reference areas which include pixels with a vector which is similar to the vector(s) of the pixel(s) of the given reference area according to the first similarity criterion As mentioned above, the first similarity criterion can define the level of similarity which is required to be considered as similar and/or the maximal number of first reference areas which are selected in the results of the sorting operation.

Note that if the given reference area is an area of a plurality of pixels, it can be compared to other areas of the same size in the reference image. The given reference area is associated with a matrix including the vectors of intensity of the pixels which belong to this given reference area. The matrix of the given reference area is compared to matrices of intensity of pixels of other areas of the same size in the reference image. This comparison can be performed using e.g. cross-correlation or other adapted methods which can be used to compare matrices (e.g. cross-entropy, etc.). This is however not limitative. The various areas of the reference image are sorted based on this comparison, and the areas which are the most similar to the given reference area are selected as the first reference areas.

The method of FIG. 2A further includes (operation 230), for each candidate defect, selecting among the first reference areas a plurality of second reference areas. The number of second reference areas is smaller than the number of first reference areas.

In a non-limitative example, the number of first areas is around 2.000 and the number of second reference areas is around 100. This is however not limitative.

Operation 230 can correspond e.g. to a second segmentation of the reference image, after the first segmentation already performed at operation 225. The second segmentation benefits from the fact that the first segmentation has already reduced the number of areas to be inspected in order to determine areas which are similar to each given reference area. Therefore, the computational efficiency of the second segmentation is improved, since it does not need to be performed on the whole reference image, but only on a limited number of first reference areas. For a given processor and memory circuitry, it is more computationally efficient to select the second areas among only the first reference areas than to determine the second reference areas among the whole reference image 301 (for a given reference image, since the number of computational operations is reduced, the time required to perform determination of the second areas is reduced).

According to some embodiments, the first segmentation is less accurate than the second segmentation (the first segmentation provides a first estimation of first reference areas, and the second segmentation reduces this number to get a more accurate subset of first reference areas), but is more computationally efficient than the second segmentation (the first segmentation relies e.g. on one or more processed images which are calculated once for all defects—whereas the second segmentation may rely on a patch comparison which requires repetitive patch calculation and patch comparison for each candidate defect).

Figure 3C:
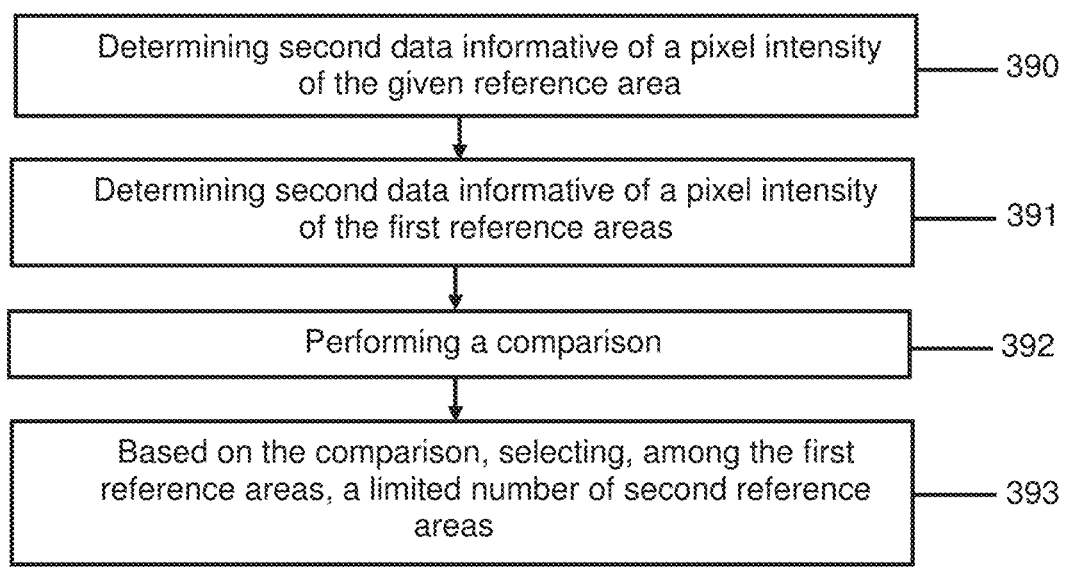
FIG. 3C illustrates a generalized flow-chart of a method of selecting a limited number of first reference areas in the reference image.

FIG. 3C illustrates a method of implementing operation 230. As shown, operation 230 can include, for each candidate defect, computing (operations 390 and 391) second data informative of a pixel intensity of the given reference area and second data informative of a pixel intensity of the first reference areas. A comparison between the second data informative of a pixel intensity of the given reference area and the second data informative of a pixel intensity of the first reference areas can be performed (operation 392). The first reference areas for which this comparison indicates a match according to a second similarity criterion are selected as the second reference areas (operation 393). The second similarity criterion can be defined e.g. by an algorithm and/or by an operator and indicates the level of similarity for which the comparison is considered as indicating a match.

In some embodiments, the first data informative of a pixel intensity of the first reference areas (as used in operation 225) and the second data informative of a pixel intensity of the first reference areas (as used in operation 230) are different/of different types. Similarly, the first data informative of a pixel intensity of the given reference area (as used in operation 225) and the second data informative of a pixel intensity of the given reference area (as used in operation 230) are different/of different types. In other words, a multiple segmentation approach of the reference image is used in which each segmentation uses different types of data for performing the segmentation.

According to some embodiments, the second data informative of a pixel intensity of a given reference area includes a patch (or kernel) informative of pixels of the given reference area. A patch includes a plurality of pixels arranged according to a predefined shape/distribution. Similarly, according to some embodiments, for each first reference area, the second data informative of a pixel intensity of the first reference area includes a patch (or kernel) informative of pixels of this first reference area.

According to some embodiments, the second data informative of a pixel intensity of a given reference area and the second data informative of a pixel intensity of the first reference areas is obtained using at least one of the reference image or one or more second processed image(s).

Note that each given reference area can include a group of one or more pixels in the reference image, or a group of one or more corresponding pixels with the same position (as the pixels of the group in the reference image) in each of the one or more second processed image(s). Similarly, each first reference area can include a group of one or more pixels in the reference image, or a group of one or more corresponding pixels with the same position (as the pixels of the group in the reference image) in each of the one or more second processed image(s).

For each given reference area, the second data can be determined using pixel intensity in the reference image and/or in the one or more second processed image(s). For example, a patch can be determined for the given reference area in the reference image and/or in the one or more second processed image(s). Similarly, for each first reference area, a patch can be determined for the first reference area in the reference image and/or in the one or more second processed image(s).

Operation 392 can include, for each given first reference area (of the plurality of first reference areas), performing a comparison between second data informative of a pixel intensity of the given first reference area in a second processed image with second data informative of a pixel intensity of the corresponding given reference area in this second processed image. The comparison of operation 392 can therefore be performed for each second processed image (and also for the reference image). Operation 393 includes using the results of these various comparisons to select, among the first reference areas, a limited number of second reference areas.

The one or more second processed image(s) can be obtained using a processing of at least part of the reference image (or of an image generated using the reference image). This processing can include filtering at least part of the reference image (smoothing, noise reduction, segmentation, contrast enhancement, etc.), or of an image generated using the reference image. In some embodiments, the processing used to obtain the second processed image(s) is different from the processing used to obtain the processed image(s) (obtaining of the processed image(s) has been described with reference to operation 225). For example, the filter used to obtain the second processed image(s) can be selected to differ from the filter used to obtain the processed image(s).

In some embodiments, the filter used to obtain the second processed image(s) can be applied only a fraction of the reference image, which includes the regions of interest of the reference image (the regions of interest include each given reference area and the corresponding first reference areas identified at operation 225). In other words, instead of applying the filter to the whole reference image, it is sufficient to process only the regions of interest.

According to some embodiments, each second processed image is calculated once for all candidate defects of a given reference image.

Figure 4A:
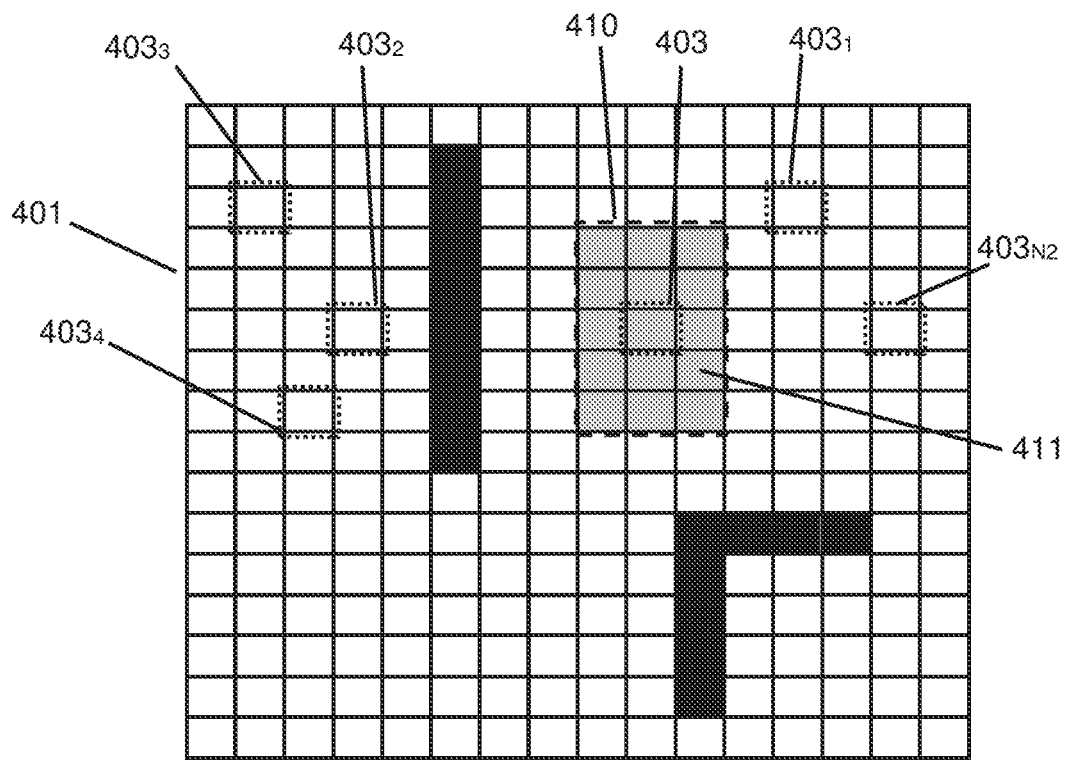
FIG. 4A illustrates a non-limitative example of a patch for a given first reference area.

FIG. 4A illustrates a non-limitative example of a patch 410 for a given reference area 403. As shown, the patch 410 comprises the given reference area 403 and a limited number of pixels 411 which are located in the vicinity of the given reference area 403. FIG. 4A also depicts first reference areas $403_1$ to $403_{N2}$ associated with the given reference area 403.

In this non-limitative example, the shape of the patch 410 is rectangular. This is however not limitative and any adapted shape can be used (square, polygon, etc.).

In some embodiments, the patch is a symmetric shape. This is not limitative, and in some embodiments the patch is not symmetric.

The limited number of pixels 411 which are selected within the patch 410 around the given reference area 403 can be adjacent. This is not mandatory, and in some embodiments the limited number of pixels 411 comprises isolated pixels or isolated groups of pixels.

Generally, the size of the patch 410 is selected as smaller than the size of the reference image 401.

In the example of FIG. 4A, patch 410 covers an area of 5 by 3 pixels (15 pixels). The patch 410 can be defined as comprising all pixels covered by its shape (in this example 15 pixels) or only some of the pixels covered by its shape (e.g. a number N of pixels which is smaller than 15 pixels).

Figure 4B:
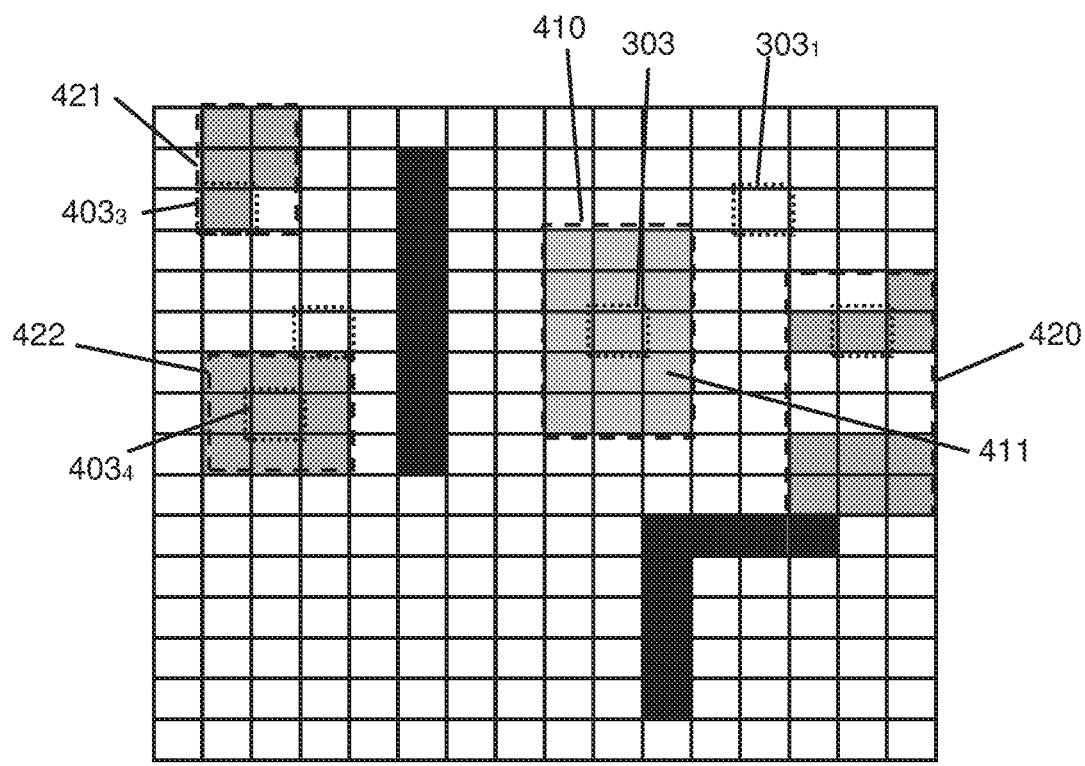
FIG. 4B illustrates various possible types of patches in a reference image.

FIG. 4B depicts various possible types of patches. The examples depicted in FIG. 4B are not limitative. For example, patch 420 comprises two distinct groups of pixels (see pixels with a grey color) which are not adjacent one to the other. In patch 421, the first reference area $403_3$ is not located in the center of the patch 421. In patch 422, the first reference area $403_4$ is located in the center of the patch 422. Patch 422 is symmetric, whereas patches 420 and 421 are not symmetric.

For each first reference area (for each given reference area in the reference image, a plurality of first reference areas has been identified in the reference image), second data informative of a pixel intensity of the first reference area can also include a patch. The size and shape of the patch defined for the given reference area can be identical to the size and shape of the patch defined for each of the first reference areas. This is however not limitative, and in some embodiments, the patch defined for the given reference area can be different from the patch defined for each of the first reference areas.

Figure 4C:
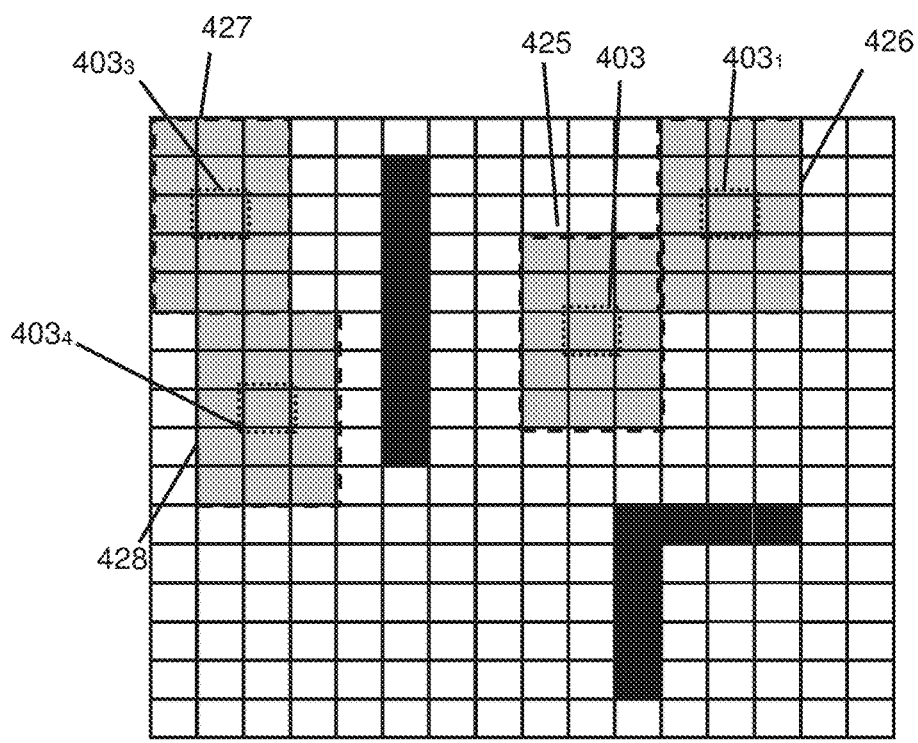
FIG. 4C illustrates a non-limitative example of patches which can be used to perform patch comparison in a reference image.

A non-limitative example of a patch comparison is illustrated in FIG. 4C. Patch 425 has been defined for the reference area 403. Patches 426, 427 and 428 have been defined for respectively the first reference areas $403_4$, $403_3$ and $403_4$.

Patch 425 of the reference area 403 is compared to the patch (426, 427 and 428) of each of the first reference areas ($403_1$, $403_3$ and $403_4$). This can be performed for each reference area of the reference image, which is associated with a different subset of first reference areas.

This comparison can include comparing the pixel intensity of one or more pixels of the patch of the given reference areas to the pixel intensity of the corresponding pixel(s) in the patch of the first reference area. Each pixel in a first patch has a corresponding pixel in a second patch to which the first patch is compared. The corresponding pixel is e.g. the pixel which has the same position in the second patch as the position of the pixel in the first patch.

This comparison can include performing a difference between the corresponding pixel intensity values and comparing this difference to a threshold.

Based on this comparison, a similarity score can be generated. Assume example that for a comparison between two patches, M pixel intensity difference values have been obtained. In some embodiments, the similarity score can be calculated based on the maximum absolute value of the M values, the minimum absolute value of the M values, an average of all M values, etc.

The second similarity criterion can define that only the first reference areas which have the highest similarity score (or the lowest similarity score, depending on the definition of the similarity score) are selected at operation 230 as the second reference areas.

The patch comparison can be performed for each candidate defect. Therefore, for each candidate defect, a limited number of second reference areas is obtained in the reference image (selected from the larger number of first reference areas obtained at operation 225).

FIG. 4C depicts a patch comparison in the reference image. However, as mentioned above, a similar patch comparison can be performed in one or more of the second processed image(s) (in addition to the patch comparison performed in the reference image, or instead of the patch comparison performed in the reference image). Therefore, the similarity score can be defined based on the results of the patch comparison in the one or more second processed image(s). The second reference areas can therefore be selected in the second processed image(s).

Figure 4D:
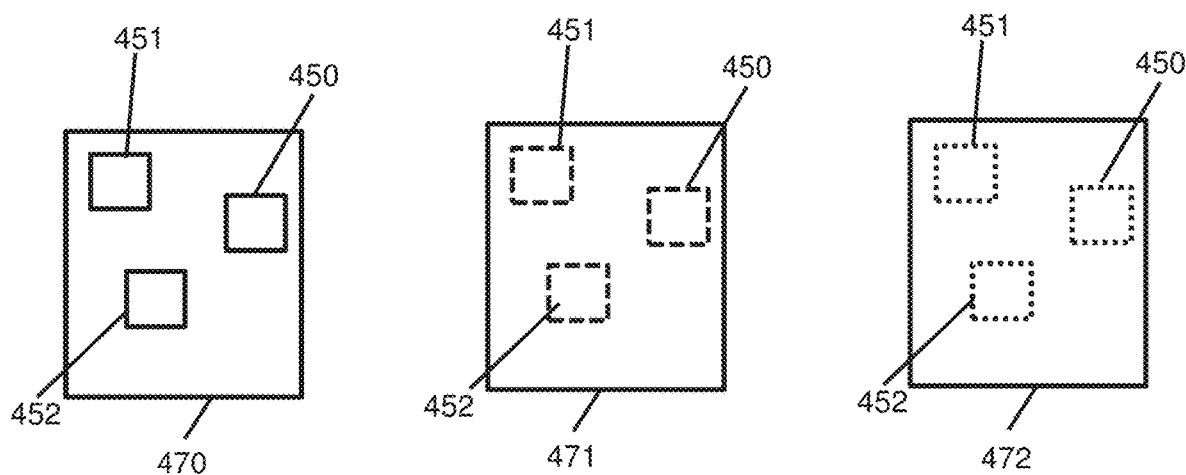
FIG. 4D illustrates a non-limitative example of patch comparison in various second processed images.

An example is illustrated in FIG. 4D. In the second processed image 470, the patch of the reference area 450 is compared to the patch of the first reference area 451 and to the patch of the first reference area 452. In the second processed image 471, the patch of the reference area 450 is compared to the patch of the first reference area 451 and to the patch of the first reference area 452. In the second processed image 472, the patch of the reference area 450 is compared to the patch of the first reference area 451 and to the patch of the first reference area 452. The similarity score can be generated for each first reference area based on these comparisons. The second reference areas can be selected among the first reference areas using the similarity score of each first reference area. In this example, the second reference areas are determined within the second processed image(s).

Figure 5A:
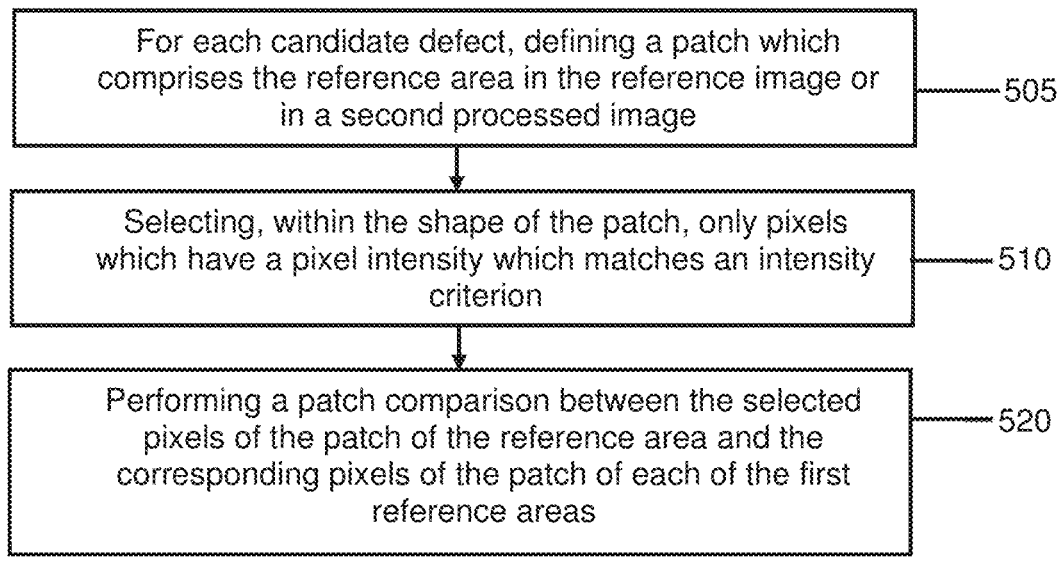
FIG. 5A illustrates a generalized flow-chart of a method of a patch comparison in a reference image or in a second processed image.

FIG. 5A illustrates a particular embodiment of a patch comparison which can be performed at operation 230.

Assume that for a given reference area, a plurality of first reference areas have been identified in the reference image at operation 225.

A patch can be defined for the given reference area (the given reference area is located within the shape of the patch), which comprises a plurality of pixels located within the patch shape of the patch (operation 505). Assume that the patch includes N pixels. In the reference image (e.g. reference image 301), or in a second processed image, the patch covers pixels $P_{1,ref}$ to $P_{N,ref}$. Pixels in the image (e.g. image 201) which have the same location in the image as the pixels $P_{1,ref}$ to $P_{N,ref}$ in the patch of the reference image (respectively in the patch of the second processed image) are noted $P_{1,img}$ to $P_{N,img}$. Pixels $P_{1,img}$ to $P_{N,img}$ are therefore pixels of the image which correspond to pixels $P_{1,ref}$ to $P_{N,ref}$ in the reference image (respectively in the second processed image).

The method can include selecting (operation 510), within the pixels which are located in the shape of the patch, only a limited number $N_1(N_1<N)$ of pixels ($P_{1,ref}$ to $P_{N1,ref}$) for which corresponding pixels in the image 201 ($P_{1,img}$ to $P_{N1,img}$—that is to say pixels in the image 201 which have the same location as pixels $P_{1,ref}$ to $P_{N1,ref}$ in the reference image or in the second processed image) meet a relevance criterion. Indeed, the defect in the image 201 may be located only on a sub-part of a pattern and therefore it can be desired to find similar locations in the image 201 which correspond specifically to this sub-part of the pattern.

According to some embodiments, the corresponding pixels $P_{1,img}$ to $P_{N1,img}$ of the image 201 which meet the relevance criterion correspond to the pixels of the image 201 which have the highest intensity (among the pixels located in an area of the image 201 corresponding to the shape of the patch defined in the reference image 301) or which have an intensity equal to or above an intensity threshold (which can be defined e.g. by an operator). As a consequence, only pixels $P_{1,ref}$ to $P_{N1,ref}$ which have the same location in the reference image 301 (respectively in the second processed image) as the corresponding pixels $P_{1,img}$ to $P_{N1,img}$ (identified as the most relevant in the image 201) are selected as being part of the patch (and therefore only these pixels will be used subsequently for patch comparison).

According to some embodiments, a defect detection algorithm has already been used to detect defects in the image 201 (for example, the defect detection algorithm described in U.S. Pat. No. 9,235,885— or another defect detection algorithm). The defect detection algorithm provides a probability of a presence of a defect for each pixel (or group of pixels) of the image 201. The corresponding pixels $P_{1,img}$ to $P_{N1,img}$ of the image 201 which meet the relevance criterion can correspond to the pixels of the image 201 which have the highest probability that a defect is present (among the pixels located in an area of the image 201 corresponding to the shape of the patch defined in the reference image 301), or for which the probability is above a threshold. As a consequence, only pixels $P_{1,ref}$ to $P_{N1,ref}$ which have the same location in the reference image 301 (respectively in the second processed image) as the corresponding pixels $P_{1,img}$ to $P_{N1,img}$ in the image 201 are selected as being part of the patch (and therefore only these pixels will be used subsequently for patch comparison).

Figure 5B:
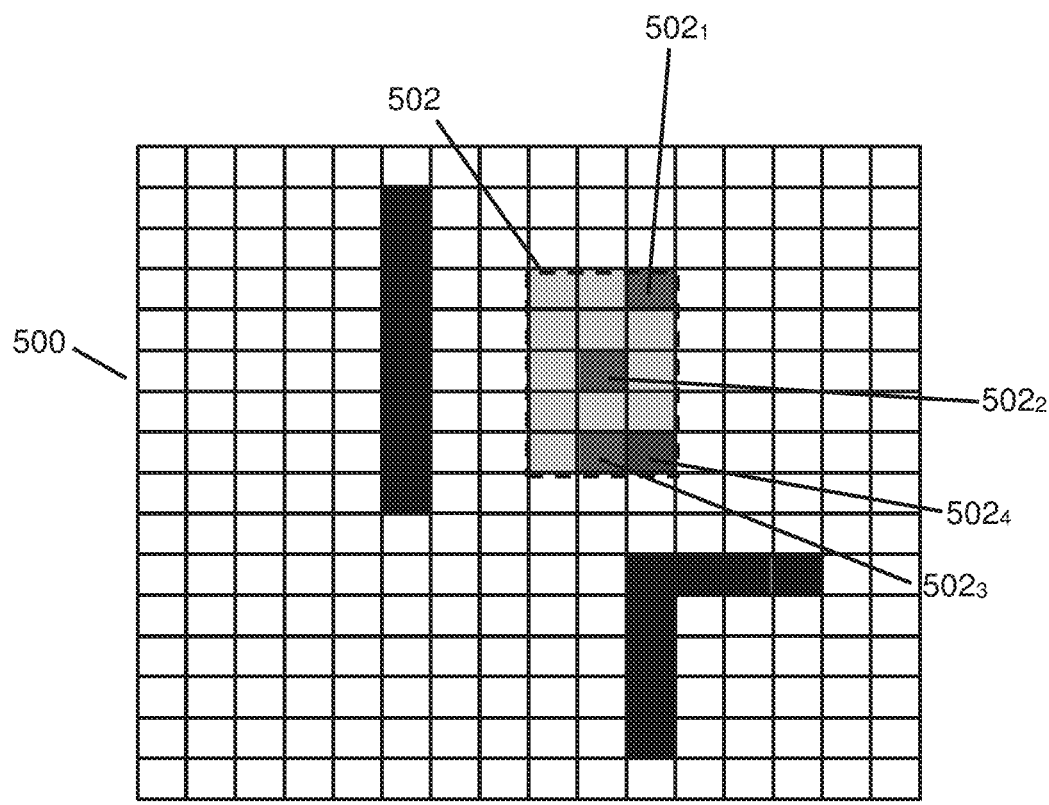
FIGS. 5B and 5C illustrate a non-limitative example of the method of FIG. 5A.
Figure 5C:
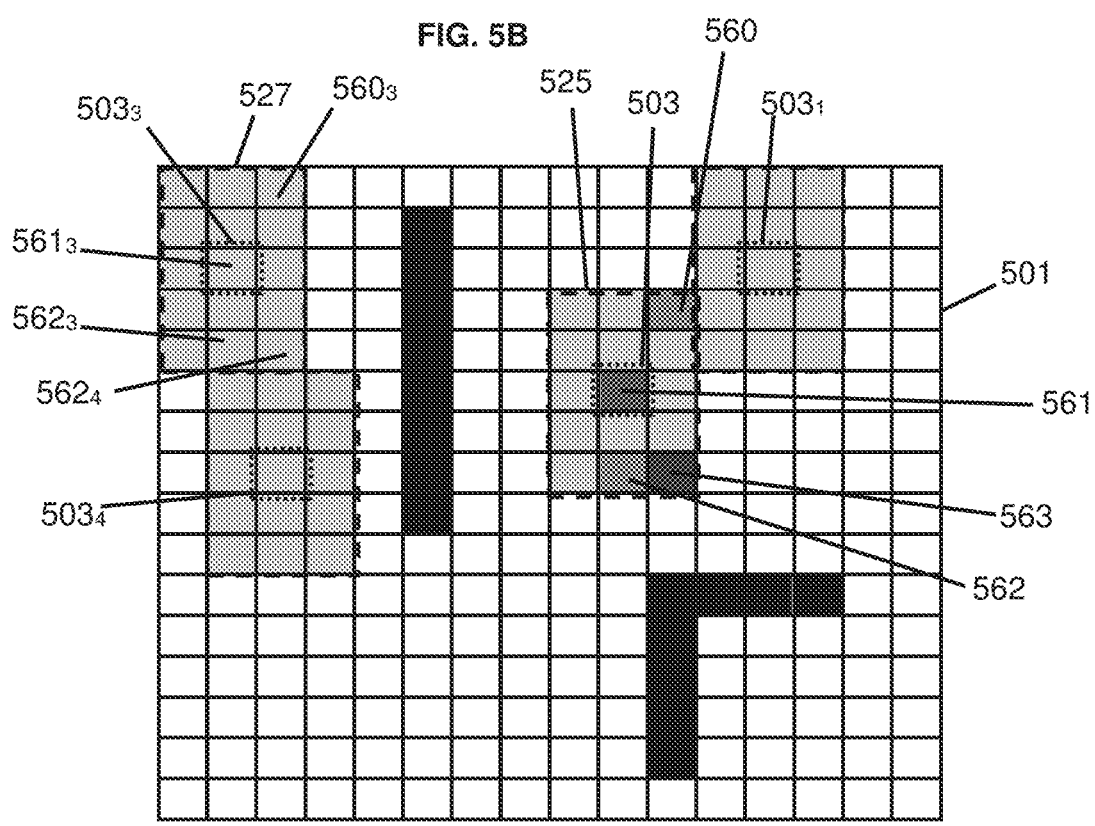

A non-limitative example is illustrated in FIGS. 5B and 5C.

Assume that a patch 525 is defined for reference area 503 in the reference image 501. The shape of the patch 525 covers an area of 5*3=15 pixels.

The pixels of the patch 525 have corresponding pixels in the image 500, which are located in the area 502 of the image 500. If the relevance criterion is defined with respect to the level of pixel intensity, then pixels $502_1$, $502_2$, $502_3$ and $502_4$ of the area 502 have the highest pixel intensity within area 502.

Pixel $502_1$ in the image 500 corresponds to pixel 560 in the reference image 501. Pixel $502_2$ in the image 500 corresponds to pixel 561 in the reference image 501. Pixel $502_3$ in the image 500 corresponds to pixel 562 in the reference image 501. Pixel $502_4$ in the image 500 corresponds to pixel 563 in the reference image 501. Therefore, only pixels 560, 561, 562 and 563 of the image 500 are selected as being part of the patch for subsequent patch comparison. Selection of this limited number of pixels further reduces the computation effort when performing the patch comparison. A good accuracy is maintained since these pixels are the most representative of the area of interest. As mentioned above, pixel intensity is only an example which can be used as the relevance criterion for selecting the limited number of pixels in the patch of the reference image.

The method of FIG. 5A further includes (operation 520) performing a patch comparison between the selected pixels of the patch of the reference area and the corresponding pixels of the patch of each of the first reference areas.

This is illustrated e.g. in FIG. 5C. When the patch 525 of the reference area 503 is compared to the patch 527 of the first reference area $503_3$, only a limited number of pixel intensity comparisons are performed: pixel intensity of pixel 560 is compared to pixel intensity of pixel $560_3$, pixel intensity of pixel 561 is compared to pixel intensity of pixel $561_3$, pixel intensity of pixel 562 is compared to pixel intensity of pixel $562_3$ and pixel intensity of pixel 563 is compared to pixel intensity of pixel $562_4$. The same type of comparison can be performed when patch 525 is compared to other patches of other first reference areas.

The second reference areas can be selected as a subset of the first reference areas for which the comparison performed at operation 393 or 520 indicates the highest level of match.

In a variant of the method of FIG. 5A, for a given reference area, different patches of different shapes are defined for the given reference area. For each shape, the patch of the given reference area is compared to a patch of the same shape associated with each of the first reference areas. A similarity score can be obtained for each shape. An aggregated similarity score can be computed which can be used to select the second reference areas which got the highest score.

Once the second reference areas have been identified in the reference image (or in the second processed image(s)), the method of FIG. 2A includes identifying (operation 240) second areas in the image corresponding to the second reference areas in the reference image (or in the second processed image(s)). The correspondence can be assessed according to a correspondence criterion. Such a correspondence criterion has been defined above with respect to operation 220. The same correspondence criterion can be used at operation 240 (this is however not mandatory). As explained above, the correspondence criterion can define e.g. that the location of a second area in the image matches the location of a second reference area in the reference image (or in the second processed image(s)).

Figure 6A:
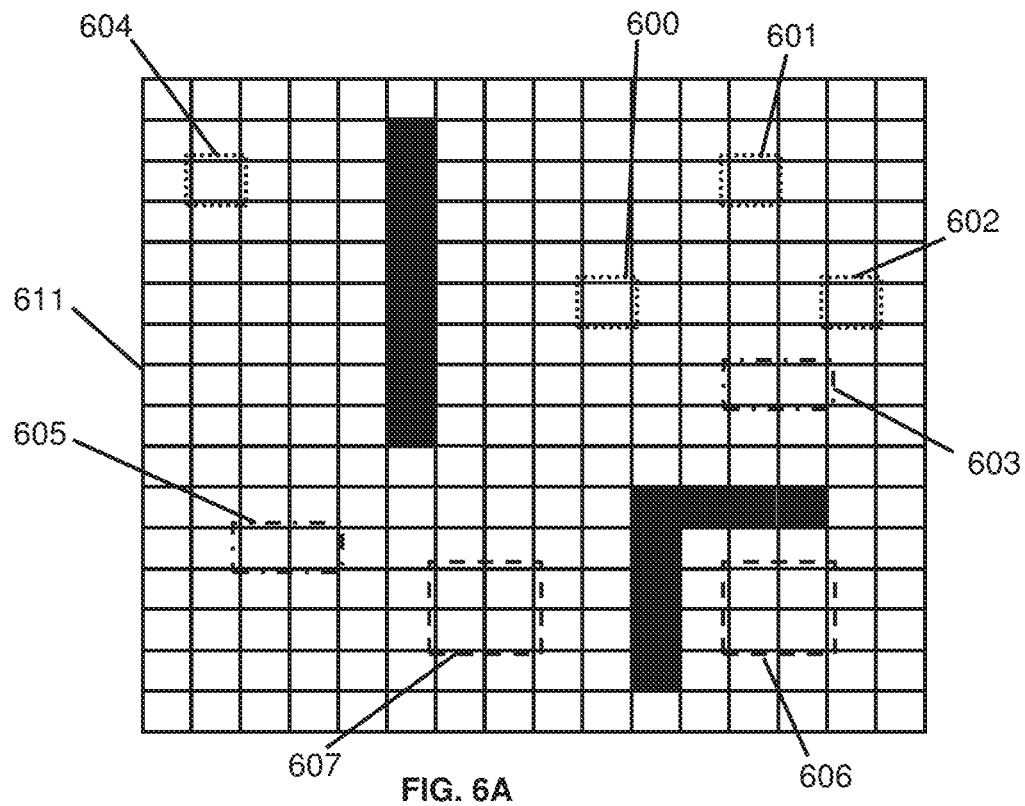
FIGS. 6A and 6B illustrate a non-limitative example of determining second areas in the image of a specimen corresponding to second reference areas in a reference image.
Figure 6B:
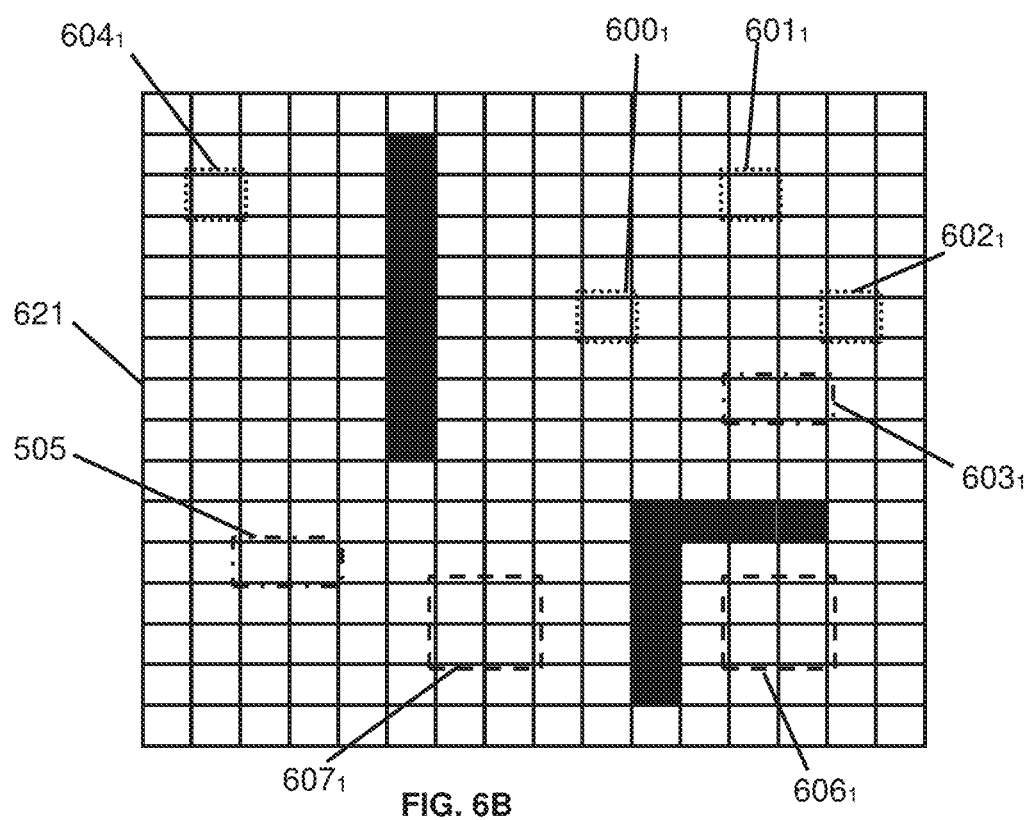

A non-limitative example is illustrated in FIG. 6A.

Assume that at operation 230, second reference areas 600 to 607 have been obtained in the reference image 611 (some of the second reference areas are associated with a first given reference area, some of the second reference areas are associated with a second given reference areas, etc.).

Operation 240 includes identifying in the image 621 second areas $600_1$ to $607_1$ which correspond respectively to the second reference areas 600 to 607 in the reference image 611 according to the correspondence criterion. As mentioned above, in some embodiments, it is possible to identify second areas in the image which correspond to second reference areas identified in the second processed image(s).

After operation 240, for each candidate defect, there is a given area corresponding to the location of the candidate defect in the image of the specimen and a plurality of second areas (in the image) associated with this given area.

The method of FIG. 2A further includes, for each candidate defect, using (operation 250) data informative of a pixel intensity of the second areas and data informative of a pixel intensity of the given area (corresponding to the location of the candidate defect in the image 201) to determine whether the candidate defect corresponds to a defect. In some embodiments, pixel intensity of pixels located in the vicinity of the second areas are also taken into account (e.g. for each given second area a patch including the given second area is used).

Operation 250 can use in some embodiments a comparison between a pattern of the given area and the pattern of each of the second areas, to determine whether the candidate defect is a defect. Operation 250 includes classifying the candidate pixel (e.g. as defective or not-defective). In some embodiments, the classification of the candidate defect as a defect may be a binary determination (i.e. present or non-present, defective or non-defective, and so on). In some embodiments, a score is generated which is indicative of the prospect (probability) that the candidate defect is a defect.

According to some embodiments, operation 250 is based on a pixel intensity in the given area and on a threshold determined based on pixel intensity of the second areas associated with the given area. For example, a difference between the pixel intensity in the given area and the pixel intensity in the first reference area (the first reference area is in the reference image and corresponds to the given area) may be determined and compared to a threshold which is determined based on the pixel intensity of the second areas. If the difference is higher than the threshold, then at operation 250 it may be determined that the candidate defect corresponds to a defect, and if the difference is lower than that threshold, then it may be determined that the candidate defect is not a defect.

It is noted that more than one threshold may be determined based on the second areas associated with a given area of a candidate defect. For example, two thresholds may be set, thereby defining a range of pixel intensity values so that if the pixel intensity of the given area is outside that range, it can be determined that the candidate defect is a defect, but if it is within that range then it can be determined that the candidate defect is not a defect.

In some embodiments, apart from defectiveness, operation 250 may include classifying the candidate defect based on another type of a classification system (e.g. a class of defects which require further processing, a class of defects by which detection or inspection criteria ought to be modified, etc.).

The output of operation 250 can be provided e.g. to another system and/or to a human using a display. This output can include, for each candidate defect, the determination of whether the candidate defect is a defect, but also other data such as location of the candidate defect.

Various other embodiments of implementing operation 250 are described hereinafter.

In an embodiment of the method of FIG. 2A, multiple reference images are used. For each given reference image, operations 220 to 250 can be performed, Therefore, for each reference image, a score indicative of a prospect that each candidate defect is a defect can be obtained. An aggregated score can be obtained based on each score to provide a final decision on whether each candidate defect is a defect.

Figure 7A:
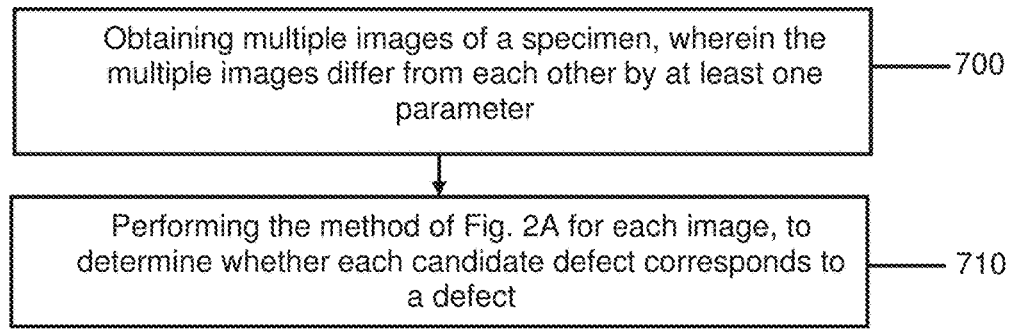
FIG. 7A illustrates a generalized flow-chart of a method of using multi-perspective images to determine defects in an image.

Attention is drawn to FIG. 7A.

According to some embodiments, the method of FIG. 7A includes obtaining operation 700) multiple images of a specimen (or at least of a region of the specimen) acquired by an imager. The multiple images differ from each other by at least one parameter selected in a list including at least illumination spectrum (which is the spectral response of an illumination portion of the imager), collection spectrum (which is the spectral response of a collection portion of the imager), illumination polarization (which is the polarization imposed by the illumination portion of the imager), collection polarization (which is the polarization imposed by the collection portion of the imager), angle of illumination (angle of illumination of the region by the illumination portion of the imager), angle of incidence (angle of incidence of the illumination portion with respect to the region), angle of collection, one or more focus offsets of an illuminating light beam, a phase of the collected beam, a collection channel (e.g. brightfield channel, greyfield channel), Fourier transform of returned light and a sensing type (for example—sensing amplitude and/or sensing phase). Such multiple images can be also called multi-perspective images. As shown, the parameter can correspond typically to an optical configuration which is modified between the different acquisitions.

Since at least two images of the specimen have been obtained, it is possible to perform, for each image, the method of FIG. 2A (in FIG. 2A it is referred to an "image"—in the method of FIG. 7A, this corresponds to each image acquired from a different perspective). As a consequence, for each perspective, a score informative of a prospect that a given defect corresponds to a defect can be computed. An aggregated score can be computed to output a final decision indicative of whether a candidate defect corresponds indeed to a defect.

For example, assume that a brightfield image and a greyfield image of a specimen have been obtained. For each candidate defect, it is possible to determine a first score indicative of whether the candidate defect as acquired in the brightfield image corresponds to a defect (using e.g. the method of FIG. 2A), and a second score indicative of whether the candidate defect as acquired in the greyfield image corresponds to a defect (using e.g. the method of FIG. 2A). An aggregated score can be computed based on the first score and the second score.

Figure 7B:
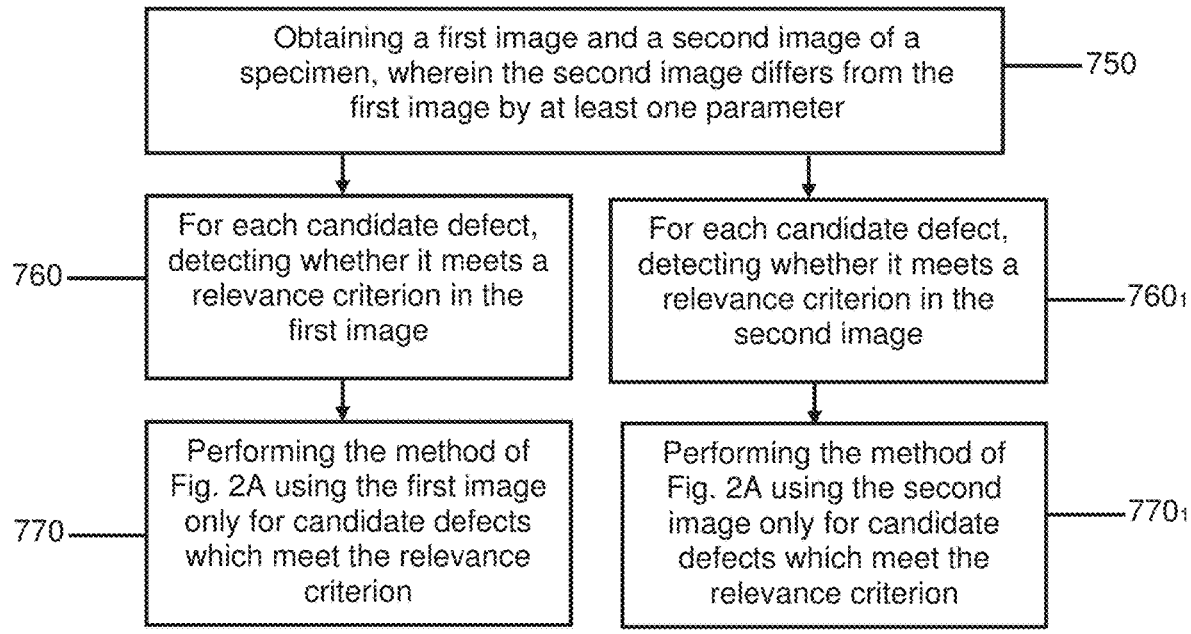
FIG. 7B illustrates an embodiment of the method of FIG. 7A.

Attention is drawn to FIG. 7B which describes an alternative implementation of the method of FIG. 7.

According to some embodiments, the method of FIG. 7B includes obtaining operation 750) multiple images of a specimen (or at least of a region of the specimen). The multiple images differ from each other by at least one parameter (as described with reference to operation 700 above). Assume for example that a first image and a second image have been obtained.

Assume that a plurality of candidate defects has been identified. For each candidate defect, a first given area the candidate defect in the first image (the first given area corresponds to the location of the candidate defect in the first image) and a second given area of the candidate defect in the second image (the second given area corresponds to the location of the candidate defect in the second image) are obtained.

For each candidate defect, it is then determined whether the candidate defect meets a relevance criterion in the first image (examples of the relevance criterion are provided hereinafter). Similarly, for each candidate defect, it is determined whether the candidate defect meets the relevance criterion in the second image.

In some embodiments, the relevance criterion is met for a candidate defect in the first image (respectively in the second image) when data informative of a pixel intensity of the first given area (respective of the second given area) meets an intensity criterion (see operations 760 and $760_1$ The intensity criterion can define e.g. a minimal pixel intensity which has to be met for each pixel.

In some embodiments, the relevance criterion is met for a candidate defect in the first image (respectively in the second image) when a probability that the candidate defect corresponds to a defect in the first image (respectively in the second image) is above a threshold. This probability can be provided by a defect detection algorithm (for example, the defect detection algorithm described in U.S. Pat. No. 9,235,885), previously used on the first image (respectively on the second image) to detect presence of defects.

In some embodiments, the relevance criterion used for the first image can be different from the relevance criterion used for the second image (e.g. the relevance criterion used to determine relevancy of a candidate defect in a first image is based on pixel intensity of the candidate defect in the first image and the relevance criterion used to determine relevancy of the candidate defect in the second image is based on a probability that the pixels of the candidate defect correspond to a defect in the second image). This is however not limitative.

The method of FIG. 2A is then used on the first image only for the candidate defects of the first image which meet the relevance criterion (operation 770). For example, if, for a candidate defect, data informative of a pixel intensity of the first given area does not meet the intensity criterion, it can be considered that the candidate defect is not sufficiently visible in the first image, and therefore can be disregarded when processing the candidate defects of the first image.

Similarly, the method of FIG. 2A is then used for the second image only for the candidate defects of the second image which meet the relevance criterion (see operation $770_1$). For example, if, for a candidate defect, data informative of a pixel intensity of the second given area does not meet the intensity criterion, it can be considered that the candidate defect is not sufficiently visible in the second image, and therefore can be disregarded when processing the candidate defects of the second image. As a consequence, computational effort is optimized.

For each candidate defect, a score can be generated indicative of whether the candidate defect is a defect. For some candidate defects, the score is generated only based on the first image (since the candidate defect has a sufficient pixel intensity only in the first image, the method of FIG. 2A is performed for this candidate defect only, using the first image). For some candidate defects, the score is generated only based on the second image (since the candidate defect has a sufficient pixel intensity only in the second image, the method of FIG. 2A is performed for this candidate defect only using the second image). For some candidate defects, the score is generated based both on the first image and the second image (since the candidate defect has a sufficient pixel intensity in both images, the method of FIG. 2A is performed for this candidate defect using the first image to obtain a first score and using the second image to obtain a second score).

Some candidate defects are disregarded since they do not meet the relevance criterion both in the first image and in the second image.

A non-limitative method of implementing operation 250 is described hereinafter.

According to some embodiments, for a candidate defect, the pixel intensity of the given area is compared to the pixel intensity of the pixel having the highest (or lowest) value out of the group of pixels of the second areas. If the difference between those values exceeds a threshold, then the candidate defect may be considered as defective.

In another example (see FIG. 8A, operation 800), for a given candidate defect, the ratio between: (a) the difference between the pixel intensity of the given area and the average of pixel intensity values of all pixels of the second areas associated with the given area; and (b) the difference between the pixel intensity of the pixel of the second areas having the highest (or lowest) pixel intensity and the average pixel intensity of the second areas, is determined. This ratio may be compared (operation 805) to a threshold (which may be determined based on the pixel intensity of the second areas, but not necessarily so), and the classification of the candidate defect as a defect or not may be based on that comparison (operation 806).

It is noted that different types of averages may be implemented, e.g. arithmetic mean, median, geometric median, geometric mean, harmonic mean, quadratic mean, weighted mean, truncated mean, interquartile mean, midrange, winsorized mean, and so forth.

Figure 8A:
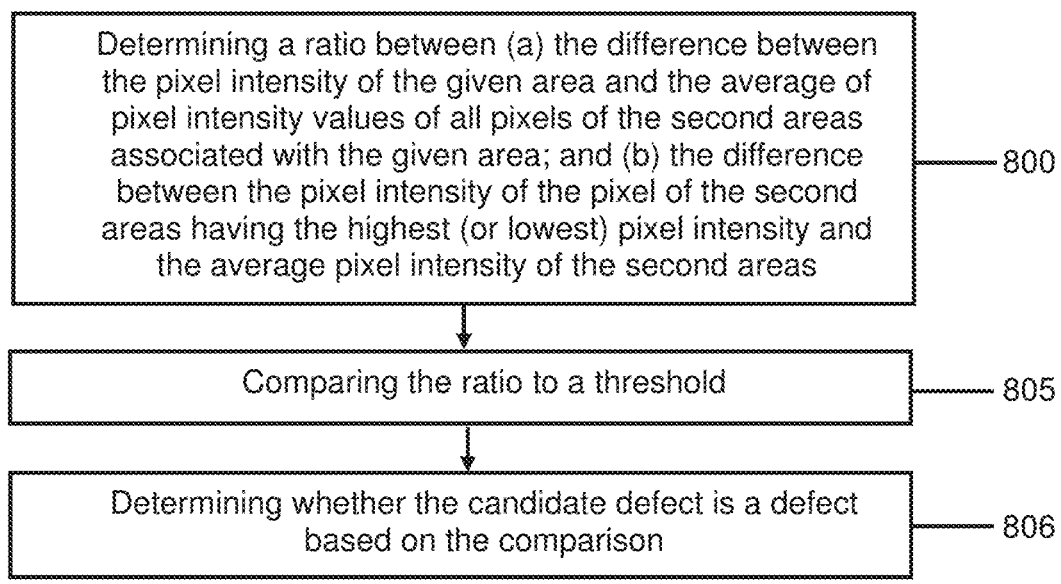
FIG. 8A illustrates a generalized flow-chart of a method of determining whether a candidate defect is a defect using a given area of the candidate defect in the image and second areas in the image associated with the area.
Figure 8B:
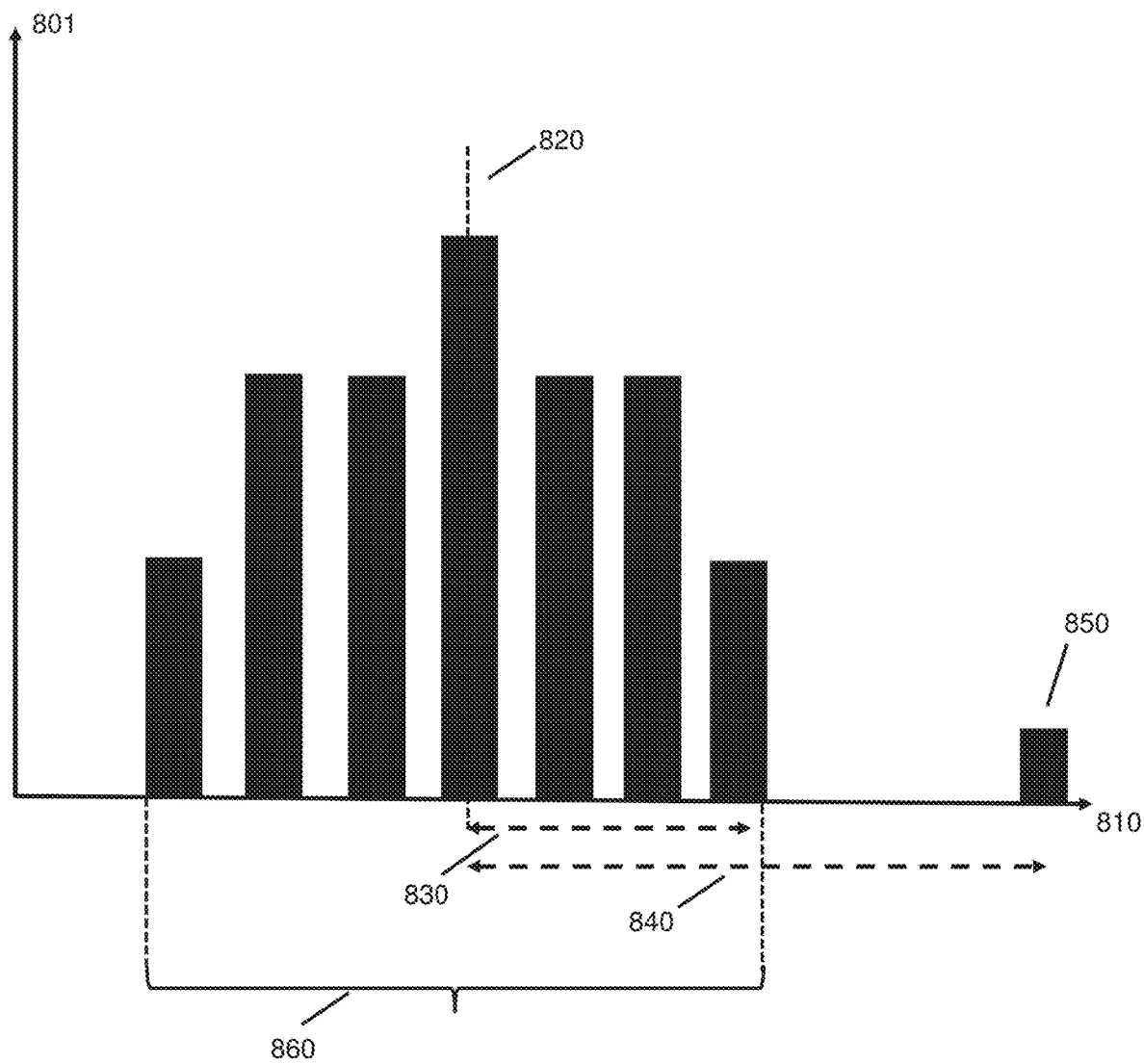
FIG. 8B illustrates a non-limitative example of the method of FIG. 8A.

A non-limitative example of the method of FIG. 8A is provided with reference to FIG. 8B, which depicts a histogram of pixel intensity. The histogram depicts pixel intensity of a given area of a candidate defect and pixel intensity of the pixels of the second areas associated with the given area. The abscissa 810 of the histogram represents the pixel intensity values and the ordinate 801 of the histogram represents the number of pixels having each of the pixel intensity values.

The pixel intensity of the given area of a candidate defect is depicted as reference 850. In a non-limitative example, the given area includes a single pixel. In other embodiments, the given area can include multiple pixels and the pixel intensity value can correspond e.g. to the average of these multiple pixels, or to the maximal value of these multiple pixels, or to the center of gravity of these multiple pixels.

The pixel intensity of the pixels of the second areas corresponds to the portion 860 of the histogram.

Value 830 corresponds to the difference between the pixel of the second areas having the highest pixel intensity and the average pixel intensity (see reference 820) of the second areas.

Value 840 corresponds to the difference between the pixel intensity 850 of the given area and the average 820 of pixel intensity values of all pixels of the second areas associated with the given area.

If the ratio between value 840 and value 830 is above a threshold, then it can be determined that the candidate defect is a defect. If the ratio between value 840 and value 830 is below a threshold, then it can be determined that the candidate defect is not a defect.

Although the example of FIG. 8B depicts a symmetrical histogram, this is not mandatory.

Figure 9:
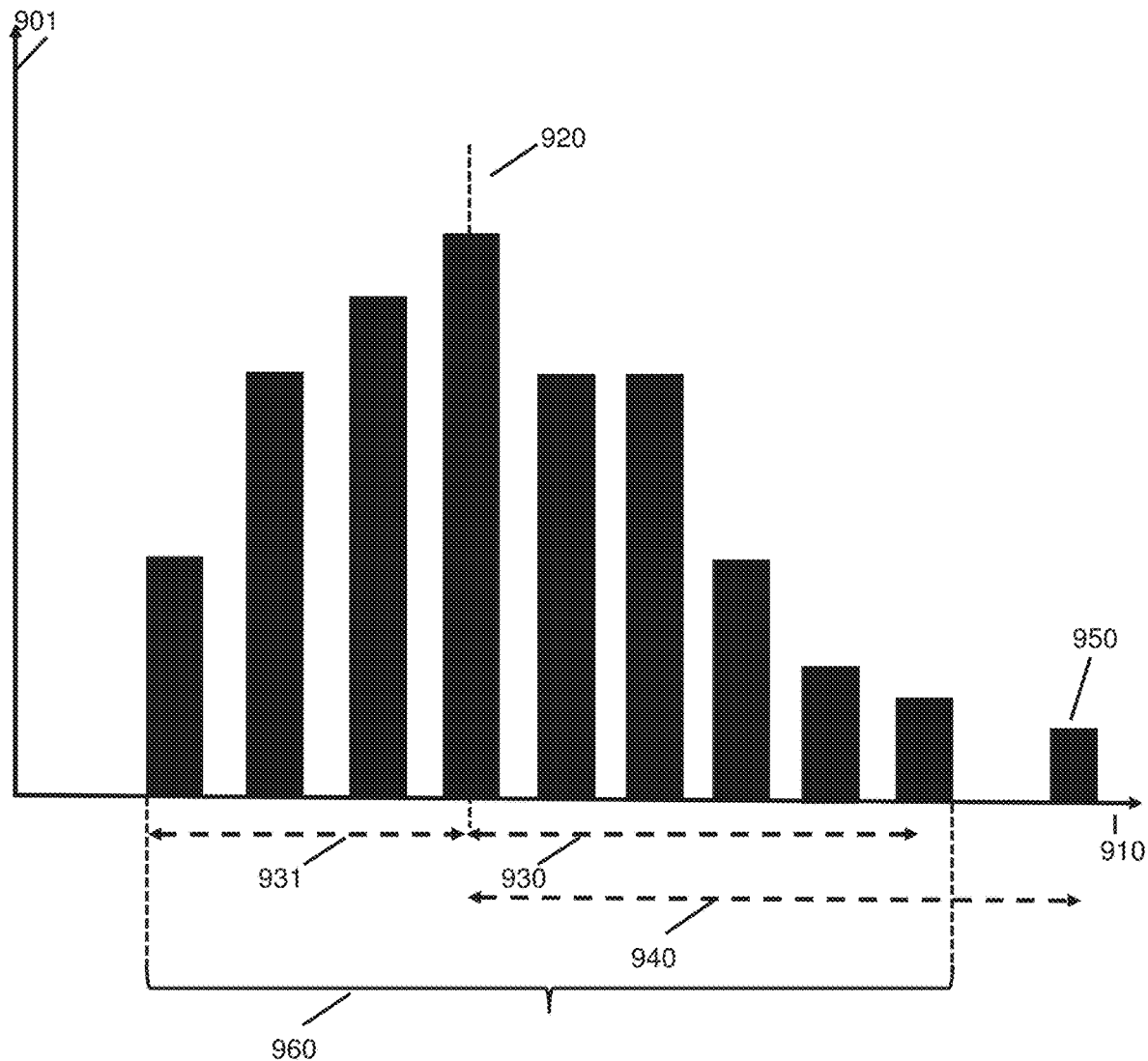
FIG. 9 illustrates another non-limitative example of the method of FIG. 8A.

FIG. 9 depicts another histogram of pixel intensity. The histogram depicts pixel intensity of a given area 950 of a candidate defect and pixel intensity of the pixels of the second areas associated with the given area (see portion 960 of the histogram). The abscissa 910 of the histogram represents the pixel intensity values and the ordinate 901 of the histogram represents the number of pixels having each of the pixel intensity values.

Since the histogram is not symmetric, two different rules can be set.

Value 930 corresponds to the difference between the pixel of the second areas having the highest pixel intensity and the average pixel intensity (see reference 920) of the second areas.

Value 940 corresponds to the difference between the pixel intensity 950 of the given area and the average 920 of pixel intensity values of all pixels of the second areas associated with the given area.

Value 931 corresponds to the difference between the average pixel intensity (see reference 920) of the second areas and the pixel of the second areas having the lowest pixel intensity.

If value 940 is above value 930 it can be determined that a defect is present.

If value 940 is below value 931 it can be determined that a defect is present.

If value 940 is between value 930 and value 931, it is less likely that this is a defect. A threshold can be set to decide whether value 940 is classified as corresponding to a defect.

In the example of FIG. 9, asymmetric decision rules are used since the absolute value of 940 is different from the absolute value of 931.

A possible generalized example of asymmetric decision rules is that the determining of the presence of the defect includes determining that the candidate defect is a defect if and only if either (a) the pixel intensity of the given area of the candidate pixel is larger than the average pixel intensity of the pixels of the second areas by at least a first threshold X or (b) the pixel intensity of the given area of the candidate pixel is smaller than the average pixel intensity of the pixels of the second areas by at least a second threshold Y, wherein X is different than Y.

It is to be understood that the invention is not limited in its application to the details set forth in the description contained herein or illustrated in the drawings.

It will also be understood that the system according to the invention may be, at least partly, implemented on a suitably programmed computer. Likewise, the invention contemplates a computer program being readable by a computer for executing the method of the invention. The invention further contemplates a non-transitory computer-readable memory tangibly embodying a program of instructions executable by the computer for executing the method of the invention.

The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

Those skilled in the art will readily appreciate that various modifications and changes can be applied to the embodiments of the invention as hereinbefore described without departing from its scope, defined in and by the appended claims.

What is claimed is:

1. A system of examination of a semiconductor specimen, the system comprising a processor and memory circuitry (PMC) configured to:
    obtain, for each given candidate defect of a plurality of candidate defects in an image of the semiconductor specimen acquired by an examination tool, a given area of the given candidate defect in the image;
    obtain a reference image;
    perform a segmentation of at least part of the reference image, the segmentation comprising, for each given candidate defect:
        obtaining a given reference area in the reference image corresponding to the given area of said given candidate defect in the image according to a correspondence criterion, and determining first reference areas in the reference image, wherein, for each given first reference area, first data informative of a pixel intensity of said given first reference area matches first data informative of a pixel intensity of the given reference area according to a first similarity criterion; and for each given candidate defect:
  for each given first reference area, compare second data informative of a pixel intensity of said given first reference area to second data informative of a pixel intensity of the given reference area;
  select among the first reference areas, a plurality of second reference areas for which the comparison indicates a match according to a second similarity criterion;
  obtain a plurality of second areas in the image, wherein each given second area corresponds to one of the second reference areas according to the correspondence criterion; and
  use data informative of a pixel intensity of the second areas and data informative of a pixel intensity of the given area to determine whether the given candidate defect corresponds to a defect.

2. The system of claim 1, wherein, for each given candidate defect, a number of the second reference areas is smaller than a number of the first reference areas.

3. The system of claim 1, wherein the PMC is configured to:
  apply at least one filter to the image to obtain at least one processed image;
  for each given first reference area, determine the first data informative of a pixel intensity of said first given reference area using said at least one processed image, and
  determine the first data informative of a pixel intensity of the given reference area using said at least one processed image.

4. The system of claim 3, wherein the at least one processed image is calculated once for all candidate defects.

5. The system of claim 1, wherein:
  the second data informative of a pixel intensity of the given reference area and the second data informative of a pixel intensity of each given first reference area is determined using at least one of:
  the reference image, or
  one or more second processed images obtained using filtering of at least part of:
    the reference image, or
    an image generated using the reference image.

6. The system of claim 1, wherein:
  the second data informative of a pixel intensity of the given reference area includes a reference patch informative of one or more pixels of the given reference area,
  for each given first reference area:
    the second data informative of a pixel intensity of the given first reference area includes a patch informative of one or more pixels of the given first reference area, and
    wherein the system is configured to compare the patch of the given first reference area to the reference patch.

7. The system of claim 6, configured to:
  select a limited subset of pixels of the reference patch, and
  for each given first reference area, compare data informative of pixel intensity of the limited subset of pixels of the reference patch to data informative of pixel intensity of corresponding pixels in the patch of the given first reference area.

8. The system of claim 7, wherein selecting the limited subset of pixels comprises at least one of:
  selecting pixels for which corresponding pixels in the image are associated with a pixel intensity which is above a threshold, or
  selecting pixels for which corresponding pixels in the image are associated with a probability of presence of a defect which is above a threshold.

9. The system of claim 1, wherein, for each given candidate defect, selecting the second reference areas among the first reference areas is more computationally efficient than selecting the second reference areas among the whole reference image.

10. The system of claim 1, wherein, for each given first reference area, the first data informative of a pixel intensity of said given first reference area is different from the second data informative of a pixel intensity of said given first reference area.

11. The system of claim 1, configured to, for each given candidate defect of a plurality of candidate defects:
  obtain, for each given candidate defect of a plurality of candidate defects:
    a first given area of the given candidate defect in a first image of the semiconductor specimen acquired by an examination tool; and
    a second given area of the given candidate defect in a second image of the semiconductor specimen acquired by the examination tool, wherein the second image differs from the first image by at least one parameter,
  perform at least one of:
    determining whether the candidate defect is a defect using the first image only if a candidate pixel meets a relevance criterion in the first image; or
    determining whether the candidate defect is a defect using the second image only if the candidate pixel meets a relevance criterion in the second image.

12. A method of examination of a semiconductor specimen, the method comprising, by a processor and memory circuitry (PMC):
  obtaining, for each given candidate defect of a plurality of candidate defects in an image of the semiconductor specimen acquired by an examination tool, a given area of the given candidate defect in the image;
  obtaining a reference image;
  performing a segmentation of at least part of the reference image, the segmentation comprising, for each given candidate defect:
    obtaining a given reference area in the reference image corresponding to the given area of said given candidate defect in the image according to a correspondence criterion; and
    determining first reference areas in the reference image, wherein, for each given first reference area, first data informative of a pixel intensity of said given first reference area matches first data informative of a pixel intensity of the given reference area according to a first similarity criterion; and
  for each given candidate defect:
    for each given first reference area, comparing second data informative of a pixel intensity of said given first reference area to second data informative of a pixel intensity of the given reference area;

selecting among the first reference areas, a plurality of second reference areas for which the comparison indicates a match according to a second similarity criterion;

obtaining a plurality of second areas in the image, wherein each given second area corresponds to one of the second reference areas according to the correspondence criterion; and using data informative of a pixel intensity of the second areas and data informative of a pixel intensity of the given area to determine whether the given candidate defect corresponds to a defect.

13. The method of claim 12, wherein, for each given candidate defect, a number of the second reference areas is smaller than a number of the first reference areas.

14. The method of claim 12, comprising:
applying at least one filter to the image to obtain at least one processed image;
for each given first reference area, determining the first data informative of a pixel intensity of said first given reference area using said at least one processed image, and
determining the first data informative of a pixel intensity of the given reference area using said at least one processed image.

15. The method of claim 14, wherein the at least one processed image is calculated once for all candidate defects.

16. The method of claim 12, wherein:
the second data informative of a pixel intensity of the given reference area includes a reference patch informative of one or more pixels of the given reference area,
for each given first reference area:
the second data informative of a pixel intensity of the given first reference area includes a patch informative of one or more pixels of the given first reference area, and
wherein the method comprises comparing the patch of the given first reference area to the reference patch.

17. The method of claim 16, comprising:
selecting a limited subset of pixels of the reference patch; and
for each given first reference area, comparing data informative of pixel intensity of the limited subset of pixels of the reference patch to data informative of pixel intensity of corresponding pixels in the patch of the given first reference area.

18. The method of claim 17, wherein selecting the limited subset of pixels comprises at least one of:
selecting pixels for which corresponding pixels in the image are associated with a pixel intensity which is above a threshold, or
selecting pixels for which corresponding pixels in the image are associated with a probability of presence of a defect which is above a threshold.

19. The method of claim 12, comprising, for each given candidate defect of a plurality of candidate defects:

obtaining, for each given candidate defect of a plurality of candidate defects:
a first given area of the given candidate defect in a first image of the semiconductor specimen acquired by an examination tool; and
a second given area of the given candidate defect in a second image of the semiconductor specimen acquired by the examination tool, wherein the second image differs from the first image by at least one parameter; and
performing at least one of:
determining whether the given candidate defect is a defect using the first image only if a candidate pixel meets a relevance criterion in the first image; or
determining whether the candidate defect is a defect using the second image only if the candidate pixel meets a relevance criterion in the second image.

20. A non-transitory computer readable medium comprising instructions that, when executed by a processor and memory circuitry (PMC), cause the PMC to perform operations comprising:
obtaining, for each given candidate defect of a plurality of candidate defects in an image of the semiconductor specimen acquired by an examination tool, a given area of the given candidate defect in the image;
obtaining a reference image;
performing a segmentation of at least part of the reference image, the segmentation comprising, for each given candidate defect:
obtaining a given reference area in the reference image corresponding to the given area of said given candidate defect in the image according to a correspondence criterion; and
determining first reference areas in the reference image, wherein, for each given first reference area, first data informative of a pixel intensity of said given first reference area matches first data informative of a pixel intensity of the given reference area according to a first similarity criterion; and
for each given candidate defect:
for each given first reference area, comparing second data informative of a pixel intensity of said given first reference area to second data informative of a pixel intensity of the given reference area;
selecting among the first reference areas, a plurality of second reference areas for which the comparison indicates a match according to a second similarity criterion;
obtaining a plurality of second areas in the image, wherein each given second area corresponds to one of the second reference areas according to the correspondence criterion; and
using data informative of a pixel intensity of the second areas and data informative of a pixel intensity of the given area to determine whether the given candidate defect corresponds to a defect.

* * * * *